(12) United States Patent
Lupascu et al.

(10) Patent No.: US 12,518,450 B2
(45) Date of Patent: Jan. 6, 2026

(54) GENERATING GRAPHIC DESIGNS BY EXPLOITING CONTRAST THROUGH GENERATIVE EDITING

(71) Applicant: Adobe Inc., San Jose, CA (US)

(72) Inventors: Marian Lupascu, Bucharest (RO); Vlad-Constantin Lungu-Stan, Bucharest (RO); Ionut Mironica, Bucharest (RO); George Bogdan Avram, Bucharest (RO)

(73) Assignee: Adobe Inc., San Jose, CA (US)

( * ) Notice: Subject to any disclaimer, the term of this patent is extended or adjusted under 35 U.S.C. 154(b) by 60 days.

(21) Appl. No.: 18/502,778

(22) Filed: Nov. 6, 2023

(65) Prior Publication Data

US 2025/0148670 A1    May 8, 2025

(51) Int. Cl.
| | | |
|---|---|---|
| *G06T 11/00* | (2006.01) | |
| *G06T 7/90* | (2017.01) | |
| *G06T 11/60* | (2006.01) | |
| *G06V 10/56* | (2022.01) | |
| *G06V 10/60* | (2022.01) | |

(52) U.S. Cl.
CPC .............. *G06T 11/60* (2013.01); *G06T 7/90* (2017.01); *G06T 11/001* (2013.01); *G06V 10/56* (2022.01); *G06V 10/60* (2022.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 11,769,017 | B1 * | 9/2023 | Gray | G06F 40/56 704/9 |
| 12,118,976 | B1 * | 10/2024 | Chen | G10L 13/027 |
| 2006/0256124 | A1 * | 11/2006 | Kuo | H04N 1/4051 345/589 |
| 2010/0290689 | A1 * | 11/2010 | Gupta | G06T 7/11 382/131 |

(Continued)

OTHER PUBLICATIONS

Couairon, Guillaume and Verbeek, Jakob and Schwenk, Holger and Cord, Matthieu, "Diffedit: Diffusion-based semantic image editing with mask guidance," arXiv preprint arXiv:2210.11427, 2022.

(Continued)

*Primary Examiner* — Martin Mushambo
(74) *Attorney, Agent, or Firm* — Keller Preece PLLC

(57) ABSTRACT

The present disclosure relates to systems, methods, and non-transitory computer readable media for generating digital designs utilizing a diffusion neural network to preserve readability and design composition while modifying image content background images and design assets. In some embodiments, the disclosed systems access a text prompt defining visual attributes of a digital design. Furthermore, the disclosed systems generate a modified text prompt by replacing chromatic information within the text prompt. Additionally, the disclosed systems determine an adaptive strength for a diffusion neural network from the text prompt. Also, the disclosed systems generate a modified digital design utilizing the diffusion neural network to process the modified text prompt according to the adaptive strength.

20 Claims, 16 Drawing Sheets

(56) References Cited

U.S. PATENT DOCUMENTS

| | | | | |
|---|---|---|---|---|
| 2014/0361971 | A1* | 12/2014 | Sala | G06F 3/013 345/156 |
| 2019/0114743 | A1* | 4/2019 | Lund | G06N 3/045 |
| 2020/0150937 | A1* | 5/2020 | Smith | G06N 3/02 |
| 2021/0058533 | A1* | 2/2021 | Aggarwal | G06V 10/56 |
| 2021/0133279 | A1* | 5/2021 | Shirani | G06F 40/279 |
| 2021/0217215 | A1* | 7/2021 | Sousa | G06N 3/045 |
| 2022/0108417 | A1* | 4/2022 | Liu | G06T 1/0007 |
| 2023/0267652 | A1* | 8/2023 | Lupascu | G06T 11/00 345/428 |
| 2023/0325975 | A1* | 10/2023 | Zhi | G06N 3/0464 |
| 2023/0334834 | A1* | 10/2023 | Bai | G06V 10/82 |
| 2024/0135514 | A1* | 4/2024 | Pakhomov | G06T 5/60 |
| 2024/0135611 | A1* | 4/2024 | Costin | G06T 11/60 |
| 2024/0161258 | A1* | 5/2024 | Maschmeyer | G06T 7/70 |
| 2024/0169631 | A1* | 5/2024 | Kim | G06T 11/001 |
| 2024/0420394 | A1* | 12/2024 | Mironica | G06T 5/60 |
| 2025/0095227 | A1* | 3/2025 | Ungureanu-Contes | G06T 11/00 |

OTHER PUBLICATIONS

Hegemann, Lena and Dayama, Niraj Ramesh and Iyer, Abhishek and Farhadi, Erfan and Marchenko, Ekaterina and Oulasvirta, Antti, "CoColor: Interactive Exploration of Color Designs," Proceedings of the 28th International Conference on Intelligent User Interfaces, pp. 106-127, 2023.

Inoue, Naoto and Kikuchi, Kotaro and Simo-Serra, Edgar and Otani, Mayu and Yamaguchi, Kota, "LayoutDM: Discrete Diffusion Model for Controllable Layout Generation," Proceedings of the IEEE/CVF Conference on Computer Vision and Pattern Recognition, pp. 10167-10176, 2023.

Kevin Roose, The New York Times, Sep. 2022. [Online]. Available: https://www.nytimes.com/2022/09/02/technology/ai-artificial-intelligence-artists.html.

Li, Jianan and Yang, Jimei and Zhang, Jianming and Liu, Chang and Wang, Christina and Xu, Tingfa, "Attribute-conditioned layout GAN for automatic graphic design," IEEE Transactions on Visualization and Computer Graphics, vol. 27, pp. 4039-4048, 2020.

Li, Junnan and Li, Dongxu and Savarese, Silvio and Hoi, Steven, "Blip-2: Bootstrapping language-image pre-training with frozen image encoders and large language models," arXiv preprint arXiv:2301. 12597, 2023.

Lupașcu, Marian and Murdock, Ryan and Mironica, Ionut and Li, Yijun, "A Fast Text-Driven Approach for Generating Artistic Content," ACM SIGGRAPH 2022 Posters, pp. 1-2, 2022.

Meng, Chenlin and He, Yutong and Song, Yang and Song, Jiaming and Wu, Jiajun and Zhu, Jun-Yan and Ermon, Stefano, "Sdedit: Guided image synthesis and editing with stochastic differential equations," International Conference on Learning Representations, 2021.

O'Donovan, Peter and Agarwala, Aseem and Hertzmann, Aaron, "Learning layouts for single page graphic designs," IEEE transactions on visualization and computer graphics, vol. 20, pp. 1200-1213, 2014.

Qiu, Qianru and Wang, Xueting and Otani, Mayu and Iwazaki, Yuki, "Color Recommendation for Vector Graphic Documents based on Multi-Palette Representation," Proceedings of the IEEE/CVF Winter Conference on Applications of Computer Vision, pp. 3621-3629, 2023.

Sharma, Gaurav and Wu, Wencheng and Dalal, Edul , "The CIEDE2000 color-difference formula: Implementation notes, supplementary test data, and mathematical observations," Color Research & Application: Endorsed by Inter-Society Color Council, The Colour Group (Great Britain), Canadian Society for Color, Color Science Association of Japan, Dutch Society for the Study of Color, The Swedish Colour Centre Foundation, Colour So, vol. 30, pp. 21--30, 2005.

Shi, Xinyu and Zhou, Ziqi and Zhang, Jing Wen and Neshati, Ali and Tyagi, Anjul Kumar and Rossi, Ryan and Guo, Shunan and Du, Fan and Zhao, Jian, "De-Stijl: Facilitating Graphics Design with Interactive 2D Color Palette Recommendation," Proceedings of the 2023 CHI Conference on Human Factors in Computing Systems, pp. 1-19, 2023.

Wang, Peng and Wang, Shijie and Lin, Junyang and Bai, Shuai and Zhou, Xiaohuan and Zhou, Jingren and Wang, Xinggang and Zhou, Chang, "ONE-PEACE: Exploring One General Representation Model Toward Unlimited Modalities," arXiv preprint arXiv:2305.11172, vol. 2023.

Yamaguchi, Kota, "Canvasvae: learning to generate vector graphic documents," Proceedings of the IEEE/CVF International Conference on Computer Vision, pp. 5481-5489, 2021.

Yun, Jooyeol and Lee, Sanghyeon and Park, Minho and Choo, Jaegul, "iColoriT: Towards Propagating Local Hints to the Right Region in Interactive Colorization by Leveraging Vision Transformer," Proceedings of the IEEE/CVF Winter Conference on Applications of Computer Vision, pp. 1787-1796, 2023.

Zhao, Nanxuan and Zheng, Quanlong and Liao, Jing and Cao, Ying and Pfister, Hanspeter and Lau, Rynson WH, "Selective region-based photo color adjustment for graphic designs," ACM Transactions on Graphics (TOG), vol. 40, pp. 1-16, 2021.

Zheng, Xinru and Qiao, Xiaotian and Cao, Ying and Lau, Rynson WH, "Content-aware generative modeling of graphic design layouts," ACM Transactions on Graphics (TOG), vol. 38, pp. 1-15, 2019.

* cited by examiner

US 12,518,450 B2

GENERATING GRAPHIC DESIGNS BY EXPLOITING CONTRAST THROUGH GENERATIVE EDITING

BACKGROUND

The field of digital design composition involves combining visual elements to create a unified design. To create realistic and visually pleasing composites, systems have developed that use models to change colors of text used or other objects that do not align with a color palette of a digital design. These recoloring models, such as generative adversarial networks ("GANs") and bidirectional encoder representations from transformers ("BERTs"), have revolutionized digital design synthesis. Indeed, some existing systems use BERT models to determine a color palette of a background image and to recolor a design element overlaid on the background image to match the color palette. Other existing systems use GANs to extract color from salient areas of a digital design and to inject the color into a design element based on local color data. Despite the advances of existing digital design systems that utilize these models, however, these conventional systems continue to suffer from a number of disadvantages, such as accuracy in preserving readability of design assets within digital designs while also retaining a cohesive overall aesthetic.

SUMMARY

This disclosure describes one or more embodiments of systems, methods, and non-transitory computer readable media that solve one or more of the foregoing or other problems in the art by generating and modifying digital designs to improve readability/visibility of design assets overlaid on background images using generative models, such as diffusion neural networks. For example, the disclosed systems generate a digital design from a text prompt (or generate a text prompt from a digital design), modify the text prompt to remove chromatic information, and determine proposed pixel regions to place a design asset within the digital design. In some embodiments, the disclosed systems also determine an adaptive strength of a diffusion neural network used to generate a modified digital design. Based on the adaptive strength, the disclosed systems further generate a modified digital design by relocating a design asset to the proposed pixel region and recoloring the design asset with replacement chromatic information derived from the initial chromatic information of the design asset. In some cases, the disclosed systems further perform a content aware correction and/or a design variation to generate multiple modified digital designs from the single initial design.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
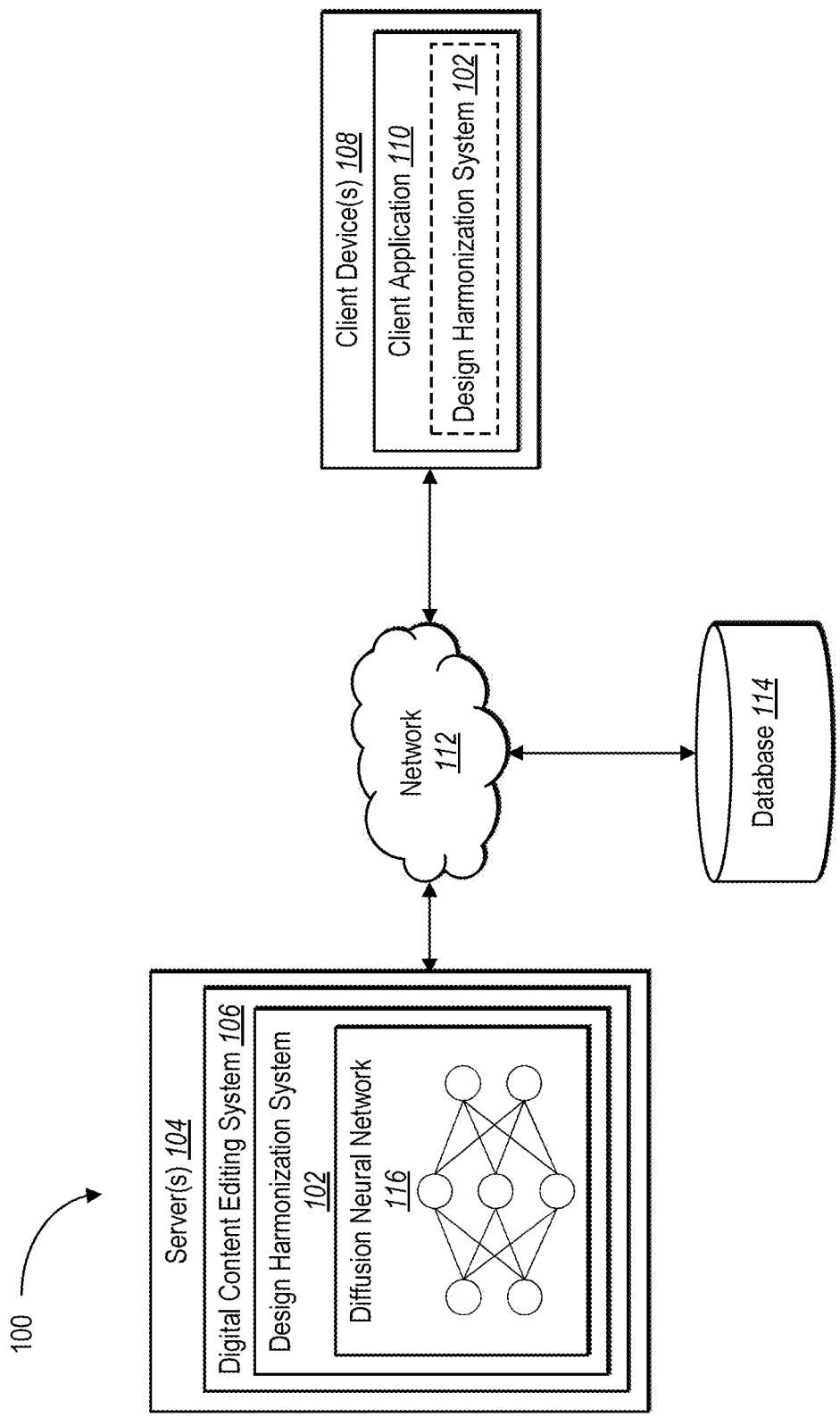
FIG. 1 illustrates an example system environment in which a design harmonization system operates in accordance with one or more embodiments.

This disclosure describes one or more embodiments of a design harmonization system that generates and modified digital designs by relocating and/or recoloring design assets as well as restructuring background digital images with generative models, such as diffusion neural networks. As suggested above, many conventional digital design systems exhibit a number of shortcomings or disadvantages, particularly in their accuracy of preserving readability or visibility of design assets within digital designs. For example, when generating or modifying digital designs, existing systems are often siloed into one of two categories: color recommendation methods or layout recommendation methods.

Many existing color recommendation systems use bidirectional encoder representations from transformers ("BERTs") to identify and remedy colors of objects in background images that do not align with a color palette or use generative adversarial networks ("GANs") to extract colors from salient areas of an image to inject into a design asset. Neither the existing BERT-based systems nor the existing GAN-based systems for color recommendation modify the structure of a digital design—they only change the colors of the background images or the overlaid design assets. Because these systems generally aim at recoloring to match a color palette of a design, the resulting digital designs can therefore be difficult to read or understand, especially in circumstances where design elements blend too well with background colors and/or are overlaid on busy regions of a background image.

Conversely, existing layout recommendation often use ranking models trained to regress on patterns to suggest layouts or positions for design elements based on factors, such as spacing, contrast balance, similarity, and an amount of white content. However, these existing systems do not modify the structure of digital designs—they only rearrange design assets by repositioning and/or resizing. Consequently, such existing systems often produce unreadable or hard-to-make-out digital designs where design assets blend too well with background colors or are overlaid against busy background areas (even though the assets may be placed based on spatial awareness or other factors in relation to other assets).

As mentioned above, in some embodiments the design harmonization system described herein can generate visible, readable digital designs using diffusion neural networks and contrast data. For example, the design harmonization system generates an initial digital design from a text prompt (or generates a text prompt from an initial digital design) and further modifies the text prompt (or a prompt vector extracted from the text prompt) to remove chromatic information. In some embodiments, the design harmonization system also modifies the prompt vector to include replacement chromatic information chromatically opposite a background color underlying the design asset. In some cases, the design harmonization system further utilizes a region proposal model to determine one or more proposed pixel regions of a background digital image for placing a design asset.

As just noted, in some embodiments, the design harmonization system performs asset harmonization to modify chromatic data for a design asset. In some cases, the design harmonization system performs asset harmonization in multiple phases. For example, the design harmonization system performs a first phase of asset harmonization to inject contrast data from three sources: luminance, replacement chromatic information (e.g., opposite color data as derived from an underlying background color), and fractal noise. As a second phase, in some embodiments, the design harmonization system alters an intermediate or auxiliary image created via the first phase using a diffusion neural network to implement an iterative diffusion process based on a modified prompt and an adaptive strength of the diffusion neural network. In some embodiments, the design harmonization system further performs content aware correction to generate a modified digital design with a visible, readable design asset overlaid on a selected region of a background image with injected contrastive color.

As suggested above, embodiments of the design harmonization system provide a variety of improvements or advantages over conventional digital image systems. For example, embodiments of the design harmonization system improve accuracy over prior systems. Indeed, while some prior systems generate digital designs that are unreadable or with design assets that are barely visible or hard to make out, the design harmonization system generates harmonized digital designs with visible, readable design assets that are intelligently placed. Specifically, the design harmonization system utilizes a color replacement algorithm to replace chromatic information extracted from a text prompt with replacement chromatic information that improves visibility of design elements against a background image. In addition, the design harmonization system utilizes a dual phase asset harmonization approach to inject the replacement chromatic information along with fractal noise and luminance. Further, the design harmonization system determines an adaptive strength of a diffusion neural network used to generate a modified digital design from the injected contrast data by placing a design asset in a proposed pixel region of a background image. Using the aforementioned techniques (and/or others described herein), the design harmonization system improves in accuracy over prior systems (e.g., color recommendation systems and layout recommendation systems), especially in generating structurally modified digital designs with design assets that are readable and visible against pixels of a background image.

Additional detail regarding the design harmonization system will now be provided with reference to the figures. For example, FIG. 1 illustrates a schematic diagram of an example system environment 100 for implementing a design harmonization system 102 in accordance with one or more embodiments. An overview of the design harmonization system 102 is described in relation to FIG. 1. Thereafter, a more detailed description of the components and processes of the design harmonization system 102 is provided in relation to the subsequent figures.

As shown, the environment includes server(s) 104, a client device 108, a database 114, and a network 112. Each of the components of the environment communicate via the network 112, and the network 112 is any suitable network over which computing devices communicate. Example networks are discussed in more detail below in relation to FIG. 13.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 13. The client device 108 communicates with the server(s) 104 via the network 112. For example, the client device 108 provides information to server(s) 104 indicating client device interactions (e.g., digital design selections, text prompts for generating digital designs, requests to modify digital designs, or other input) and receives information from the server(s) 104 such as generated digital designs. Thus, in some cases, the design harmonization system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital designs, design assets, and/or background images. In some cases, the client application 110 includes all or part of the design harmonization system 102 and/or the diffusion neural network 116.

As illustrated in FIG. 1, the environment includes the server(s) 104. The server(s) 104 generates, tracks, stores, processes, receives, and transmits electronic data, such as design generating inputs (e.g., text prompts), sample digital designs, generated digital designs, and/or design assets. For example, the server(s) 104 receives data from the client device 108 in the form of an indication of a client device interaction (e.g., a text prompt) to generate a digital design or to generate a text prompt from a digital design. In response, the server(s) 104 transmits data to the client device 108 to cause the client device 108 to display or present a generated digital design (or a generated text prompt) based on the client device interaction.

In some embodiments, the server(s) 104 communicates with the client device 108 to transmit and/or receive data via the network 112, including client device interactions, design generation requests, digital designs, and/or other data. In some embodiments, the server(s) 104 comprises a distributed server where the server(s) 104 includes a number of server devices distributed across the network 112 and located in different physical locations. The server(s) 104 comprise a content server, an application server, a communication server, a web-hosting server, a multidimensional server, a container orchestration server, or a machine learning server. The server(s) 104 further access and utilize the database 114 to store and retrieve information such as stored digital designs, background images, design assets, chromatic information, adaptive strength data, all or part of the diffusion neural network 116, and/or other data.

As further shown in FIG. 1, the server(s) 104 also includes the design harmonization system 102 as part of a digital content editing system 106. For example, in one or more implementations, the digital content editing system 106 is able to store, generate, modify, edit, enhance, provide, distribute, and/or share digital content, such as digital designs. For example, the digital content editing system 106 provides tools for the client device 108, via the client application 110, to generate digital designs utilizing the diffusion neural network 116.

In one or more embodiments, the server(s) 104 includes all, or a portion of, the design harmonization system 102. For example, the design harmonization system 102 operates on the server(s) to generate and provide digital designs. In some cases, the design harmonization system 102 utilizes, locally on the server(s) 104 or from another network location (e.g., the database 114), a diffusion neural network 116 to generate digital designs. In addition, the design harmonization system 102 includes or communicates with a diffusion neural network 116 for implementation and training.

In certain cases, the client device 108 includes all or part of the design harmonization system 102. For example, the client device 108 generates, obtains (e.g., downloads), or utilizes one or more aspects of the design harmonization system 102 from the server(s) 104. Indeed, in some implementations, as illustrated in FIG. 1, the design harmonization system 102 is located in whole or in part on the client device 108. For example, the design harmonization system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the design harmonization system 102. For example, in some embodiments, the server(s) 104 train one or more neural networks discussed herein and provide the one or more neural networks to the client device 108 for implementation. In some embodiments, the server(s) 104 train one or more neural networks, the client device 108 request design edits, the server(s) 104 generate modified digital designs utilizing the one or more neural networks. Furthermore, in some implementations, the client device 108 assists in training one or more neural networks.

Although FIG. 1 illustrates a particular arrangement of the environment, in some embodiments, the environment has a different arrangement of components and/or may have a different number or set of components altogether. For instance, as mentioned, the design harmonization system 102 is implemented by (e.g., located entirely or in part on) the client device 108. In addition, in one or more embodiments, the client device 108 communicates directly with the design harmonization system 102, bypassing the network 112. Further, in some embodiments, the diffusion neural network 116 includes one or more components stored in the database 114, maintained by the server(s) 104, the client device 108, or a third-party device.

Figure 2A:
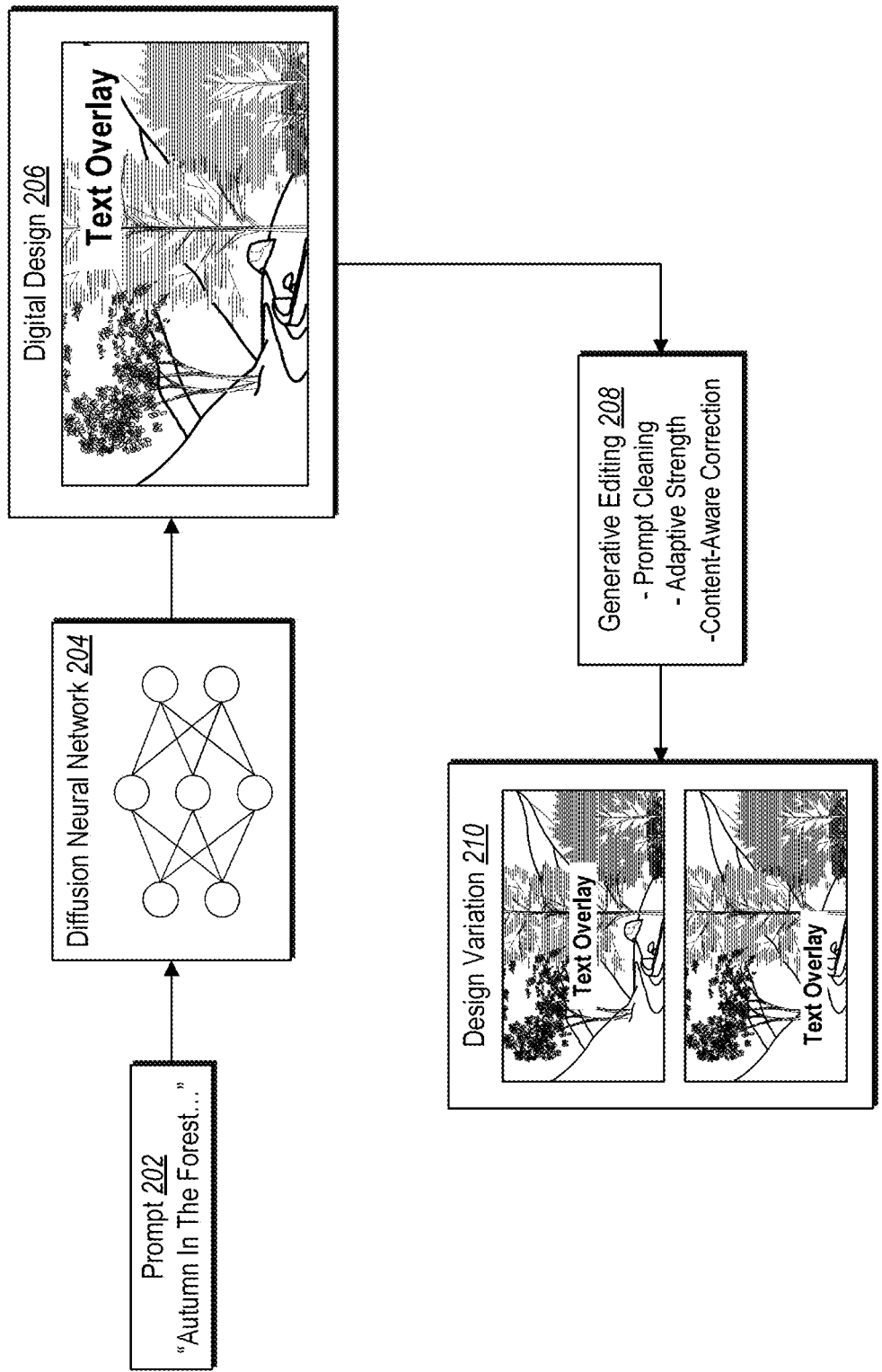
FIGS. 2A-2B illustrate overviews of generating a digital design utilizing a diffusion neural network to improve visibility and harmony in accordance with one or more embodiments.
Figure 2B:
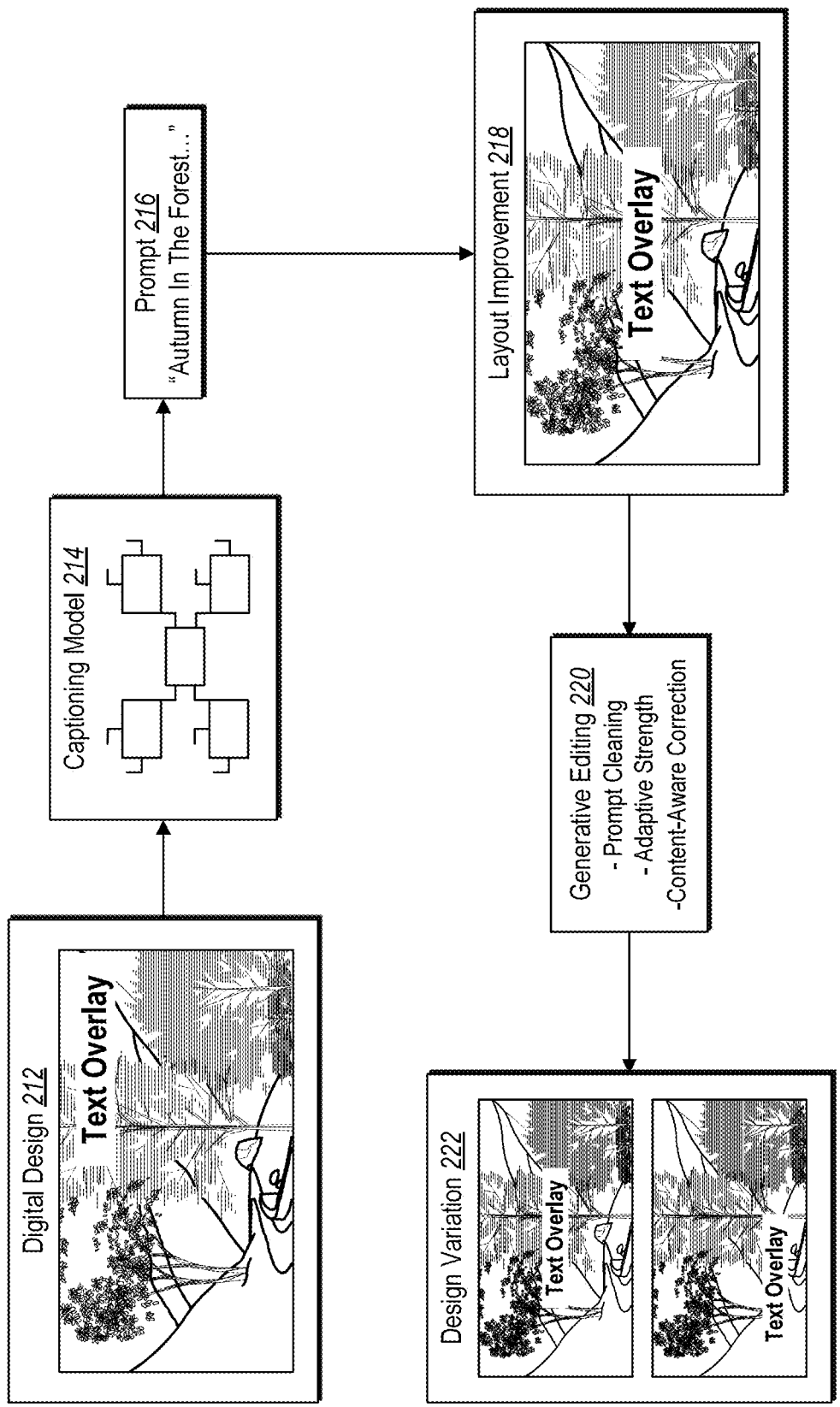

As mentioned, in one or more embodiments, the design harmonization system 102 generates a harmonized digital design with visible/readable design assets by using a diffusion neural network to generate a design asset at a proposed pixel location using contrast data injection and an adaptive strength of the diffusion neural network. FIG. 2A illustrates an overview of generating a harmonized digital design starting from a text prompt received from a client device in accordance with one or more embodiments. Thereafter, FIG. 2B illustrates generating a harmonized digital design starting from an initial digital design in accordance with one or more embodiments. Additional detail regarding the various acts and processes mentioned with respect to FIGS. 2A-2B is provided thereafter with respect to subsequent figures.

As illustrated in FIG. 2A, the design harmonization system 102 receives a text prompt 202 from a client device (e.g., the client device 108). In particular, the design harmonization system 102 receives the text prompt 202 that includes a textual description defining visual attributes of a digital design (e.g., colors, asset positions, and background scenery) to generate using a generative model, such as a diffusion neural network. Indeed, in some cases, the design harmonization system 102 receives the text prompt 202 in the form of a natural language description of digital content for a digital design. In certain embodiments, the design harmonization system 102 does not receive the text prompt 202 from a client device, but instead receives or accesses an initial digital design selected or generated via the client device. Such embodiments are described in further detail below with reference to FIG. 2B.

In some embodiments, a digital design includes or refers to a digital composition that visually portrays or depicts one or more design elements overlaid on a background image. Indeed, a digital design include pixel representations of user-generated or model-generated compositions with design assets arranged against a background image. In some cases, a design asset includes or refers to a digital object, such as a glyph (a text character), a set of glyphs, and/or a graphic placed to overlay a region of pixels of a background image. In these or other cases, a background image includes or refers to a digital image underlying one or more design assets as part of a digital design. A background image sometimes includes pixels with pixel values reflecting a particular scene or object using a certain color palette or aesthetic for the digital design.

As further illustrated in FIG. 2A, the design harmonization system 102 utilizes a diffusion neural network 204 to generate a digital design 206 from the text prompt 202. To elaborate, the design harmonization system 102 passes or transmits the text prompt 202 to the diffusion neural network 204, whereupon the diffusion neural network 204 extracts a prompt vector from the text prompt 202 and iteratively denoises (through a diffusion process) a random noise vector toward the prompt vector to generate the digital design 206. As shown, the digital design 206 depicts an autumn forest scene to match the text prompt 202 ("Autumn in the forest . . . "), with a design asset of "Text Overlay" overlaid in the upper right corner. Indeed, the text prompt 202 can define the location of the design asset as well as the content of the background image within the digital design 206, and the diffusion neural network 204 generates the digital design 206 accordingly.

In some embodiments, a neural network includes or refers to a machine learning model that is trainable and/or tunable based on inputs to generate predictions, determine classifications, or approximate unknown functions. For example, a neural network includes a model of interconnected artificial neurons (e.g., organized in layers) that communicate and learn to approximate complex functions and generate outputs (e.g., digital designs) based on a plurality of inputs provided to the neural network. In some cases, a neural network refers to an algorithm (or set of algorithms) that implements deep learning techniques to model high-level abstractions in data. For example, a neural network includes a deep neural network, a convolutional neural network, a recurrent neural network (e.g., an LSTM), a graph neural network, a transformer, or a generative neural network (e.g., a generative adversarial neural network or a diffusion neural network).

Along these lines, a diffusion neural network includes or refers to a type of generative neural network that utilizes a process involving diffusion and denoising to generate a digital image or a digital design. For example, the design harmonization system 102 provides a diffusion neural network 204 with the text prompt 202, whereupon the diffusion neural network 204, through its diffusion layers, adds noise to a prompt vector extracted from the text prompt 202 to generate a noise map or inversion (e.g., a representation of the digital image with added noise). In addition, the design harmonization system 102 utilizes the architecture of the diffusion neural network 204 (e.g., a plurality of denoising layers that remove noise or recreate a digital image) to generate a digital design 206 from the noise map/inversion. In some implementations, the diffusion neural network 204 utilizes a conditioning mechanism to condition the denoising layers for adding edits or modifications in generating a digital design from the noise map/inversion. For example, a conditioning mechanism includes a computer-implemented model (e.g., a conditioning encoder that utilizes a neural network encoding architecture) that generates or utilizes feature representations of desired changes or edits that are utilized by denoising layers to generate a modified digital design. Thus, conditioning sometimes includes utilizing these feature representations (e.g., concatenating or combining feature representations with representations generated by the denoising layers) with the layers to generate a modified/inpainted digital image. A diffusion neural network encompasses a variety of diffusion architectures, including a deterministic forward diffusion model or denoising diffusion implicit model. Example architectures include DALL-E, stable diffusion, MIDJOURNEY, or ADOBE FIREFLY. In one or more implementations, the design harmonization system 102 utilizes a diffusion neural network as described by U.S. patent application Ser. No. 18/363,980 filed on Aug. 2, 2023 or as described by U.S. patent application Ser. No. 18/308,017 filed Apr. 27, 2023, the entire contents of the foregoing patent applications are hereby incorporated by reference. In one or more implementations, the diffusion neural network 204 is a latent space diffusion model. In one or more alternative implementations, the diffusion neural network 204 is a pixel space diffusion model.

As further illustrated in FIG. 2A, the design harmonization system 102 performs a generative editing 208. For example, the design harmonization system 102 implements or performs processes or operations to edit or modify the digital design 206 for improved visibility/readability. In some cases, the generative editing 208 includes prompt cleaning. For instance, the design harmonization system 102 cleans prompt data by removing or replacing chromatic information of a prompt (or a prompt vector) using a color replacement algorithm. In addition, the generative editing 208 includes determining and utilizing an adaptive strength of a diffusion neural network (e.g., the diffusion neural network 204 or another diffusion neural network for generating a modified digital design). Further, in some cases, the generative editing 208 includes content-aware correction to modify colors of a digital asset using a contrast correction algorithm. For instance, the design harmonization system 102 uses a contrast correction algorithm to modify asset colors according to contrast ratios between colors in a background image and an initial color of a design asset. In some embodiments, the design harmonization system 102 performs additional steps or processes as part of the generative editing 208, such as a dual-phase asset harmonization. Additional detail regarding the various acts or processes of the generative editing 208 is provided below with reference to subsequent figures.

As shown, the design harmonization system 102 further generates design variation 210. More particularly, the design harmonization system 102 utilizes one or more design variation processes or operations to generate multiple variations of a modified digital design. Indeed, the design harmonization system 102 can generate and provide multiple design variations by generating several outputs through adjustments to various processes involved in the generative editing 208 (or elsewhere in the pipeline).

As noted above, in certain embodiments, the design harmonization system 102 generates a modified digital design initiated by an initial digital design from a client device, rather than initiated by an initial text prompt from the client device. In particular, the design harmonization system 102 receives or accesses a digital design as an initial starting point for determining modifications for improved visibility or readability. As introduced above, FIG. 2B illustrates an example overview of generating a modified digital design from an initial digital design in accordance with one or more embodiments.

As illustrated in FIG. 2B, the design harmonization system 102 accesses or receives a digital design 212. For example, the design harmonization system 102 receives the digital design 212 from a client device (e.g., the client device 108) as a user-generated composition depicting one or more design assets overlaid on certain pixel regions of a background image, where the asset and background image have certain colors and/or depicted objects. As shown, the digital design 212 depicts a forest scene with trees along a path and an asset of "Text Overlay" overlaid in the upper right corner.

As further illustrated in FIG. 2B, the design harmonization system 102 utilizes a captioning model 214 to generate a text prompt 216 from the digital design 212. For example, a captioning model includes or refers to a neural network that generates a text prompt or a textual description of a digital design, including word-based indications of color information, asset locations, image content, and/or other visual attributes. In some cases, the captioning model 214 has a specific architecture, such as a bootstrapping language-image pretraining ("BLIP") model or a BLIP-2 model as described by Junnan Li et al. in *BLIP-2: Bootstrapping Language-Image Pre-Training with Frozen Image Encoders and Large Language Models*, arXiv: 2301.12597 (2023).

Thus, the design harmonization system 102 generates the text prompt 216 from the digital design 212.

As also shown in FIG. 2B, the design harmonization system 102 performs a layout improvement 218. More specifically, the design harmonization system 102 improves or modifies the layout of the digital design 212 by using a region proposal model to determine or indicate pixel regions of the digital design 212 for placing a design asset. For instance, a region proposal model includes or refers to a neural network that determines or generates pixels regions of a background image to propose as locations for placing a design asset. In some embodiments, a region proposal model generates probabilities or compatibilities of pixels for placing a design asset. In some cases, a region proposal model generates a heat map to reflect the probabilities or compatibilities of pixels across a background image.

Based on determining proposed pixel regions of a background image for placing a design asset, the design harmonization system 102 further selects a proposed region. For example, the design harmonization system 102 selects a region with a pixel area large enough to fit a design asset's dimensions and which satisfies at least a threshold compatibility or heat map score (e.g., as averaged across the scores for the pixels in the region).

As further illustrated in FIG. 2B, the design harmonization system 102 performs generative editing 220. More specifically, the design harmonization system 102 performs steps or processes for prompt cleaning, determining an adaptive strength, content-aware correction, and/or dual phase asset harmonization. Additional detail regarding the various processes of the generative editing 220 is provided below with reference to subsequent figures.

Additionally, as shown in FIG. 2B, the design harmonization system 102 performs or generates design variation 222. In particular, the design harmonization system 102 modifies and repeats one or more processes involved in the generative editing 220 to generate variations of a modified digital design. In each variation, the design harmonization system 102 nevertheless generates a harmonized digital design that is visible and readable, with a design asset placed in a proposed pixel region, recolored, and/or overlaid against recolored pixels.

Figure 3:
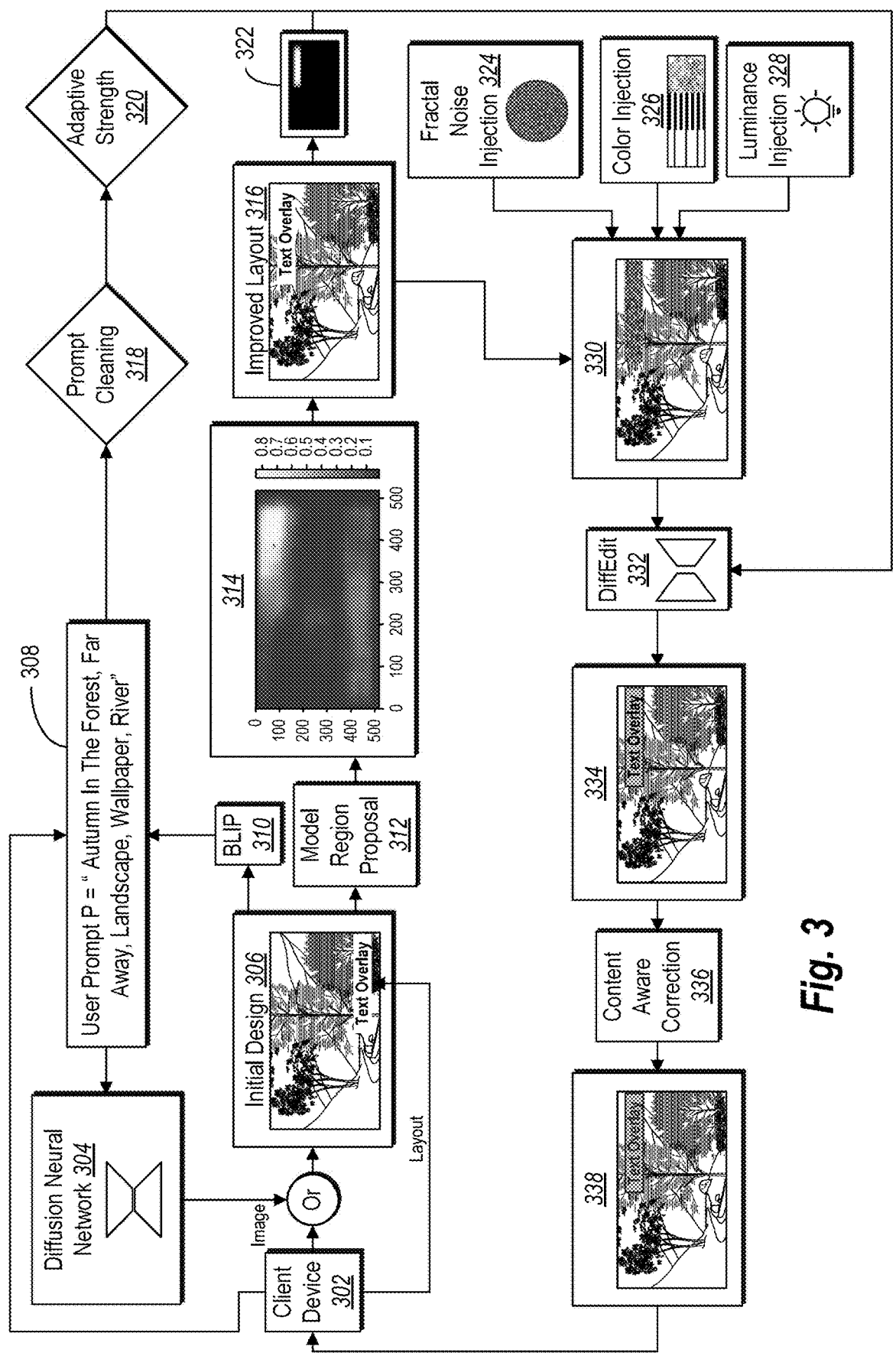
FIG. 3 illustrates an example diagram of generating a digital design using a diffusion neural network and various processes in accordance with one or more embodiments.

As mentioned above, in certain described embodiments, the design harmonization system 102 utilizes various models, such as neural networks to generate a harmonized digital design. In particular, the design harmonization system 102 utilizes one or more diffusion neural networks, a region proposal model, a captioning model, a color replacement algorithm, and/or a contrast correction algorithm (in addition to other processes) to generate a digital design. FIG. 3 illustrates an example diagram of a design generation pipeline, including various models and algorithms, for the design harmonization system 102 in accordance with one or more embodiments.

As illustrated in FIG. 3, the design harmonization system 102 either generates an initial digital design 306 from a text prompt 308 received from a client device 302 or generates the text prompt 308 from the initial digital design 306 received from the client device 302. Indeed, depending on whether the client device 302 provides the text prompt 308 or the initial digital design 306, the design harmonization system 102 determines its starting point and generates the content not received from the client device 302. For instance, the design harmonization system 102 generates the text prompt 308 from the initial digital design 306 by using a captioning model 310 (e.g., a BLIP model). Alternatively, the design harmonization system 102 generates the initial digital design 306 from the text prompt 308 by using a diffusion neural network 304 to denoise a (randomly seeded) noise vector toward a prompt vector extracted from the text prompt 308 in a vector space.

As further illustrated in FIG. 3, the design harmonization system 102 generates a region proposal map 314 from the initial digital design 306. To elaborate, the design harmonization system 102 utilizes a region proposal model 312 to generate the region proposal map 314. For example, the region proposal model 312 generates the region proposal map 314 that is a scale size (e.g., a 1:1 scale or some other scale) of the initial digital design 306. In some cases, the design harmonization system 102 generates the region proposal map 314 to determine or identify pixel regions of a background image within the initial digital design 306 where a digital design should be placed. In some cases, the region proposal model 312 is trained on a design-specific level and/or asset-specific level to identify pixel regions with the appropriate size for the dimensions of a design asset and/or where the asset would be more visible or readable. For example, the region proposal model 312 is trained on approximately 120,000 ADOBE EXPRESS templates that include background images and design assets of varying shapes, sizes, colors, placements, characters, and graphics. As shown, the region proposal map 314 indicates lighter colors for pixel regions where a design asset should be placed or relocated (e.g., the upper right).

Based on the region proposal map 314, the design harmonization system 102 generates or determines an improved layout 316. More specifically, the design harmonization system 102 generates an intermediate digital design or an intervening digital design with the improved layout 316 that relocates the design asset to a pixel region indicated by the region proposal map 314 (e.g., a region with a highest probability). In some cases, the design harmonization system 102 can generate an improved layout with alternative placement in a secondary region indicated by the region proposal map 314, such as in an area of pixels corresponding to the lighter portions of the region proposal map 314 which are not as light as those of the first proposed region.

As shown in FIG. 3, the design harmonization system 102 performs a prompt cleaning 318. In particular, the design harmonization system 102 cleans or modifies prompt data associated with the text prompt 308. For example, the design harmonization system 102 replaces chromatic information in the text prompt 308 with replacement chromatic information defining a color that is chromatically opposite to the color of the design asset (as described or indicated in the text prompt 308). In some cases, the design harmonization system 102 extracts a prompt vector from the text prompt 308 and replaces chromatic information in the prompt vector with chromatically opposite chromatic information. In doing so, the design harmonization system 102 evens out the direction of a chromatic vector as part of the denoising process of the diffusion neural network 332 when generating the modified digital design 334. By evening out the direction of the chromatic vector, the design harmonization system 102 improves the diffusion process, requiring fewer denoising steps and/or achieving improved quality with a set/constant number of denoising steps.

As also shown in FIG. 3, the design harmonization system 102 determines an adaptive strength 320. More specifically, the design harmonization system 102 determines a strength of the diffusion neural network 332 in its aggressive denoising a vector. For certain prompts, the diffusion process is more aggressive than on others, and the strength is not uniform because the distance between the prompt vector and the center of the classifier free guidance in the vector space (e.g., the hypersphere) varies. To overcome such issues in variability, the design harmonization system 102 utilizes an adaptive strength 320 to approximate the diffusion strength according to the norm of the prompt vector (e.g., projection of the text prompt 308) in latent space.

As further illustrated in FIG. 3, the design harmonization system 102 performs a number of asset harmonization processes, such as generating an asset mask 322, contrast injection (including fractal noise injection 324, color injection 326, and luminance injection 328), and utilizing a diffusion neural network 332 to generate a modified digital design 334. As just noted, the design harmonization system 102 generates and applies an asset mask 322 to the improved layout 316. To elaborate, the design harmonization system 102 generates an asset mask 322 (e.g., a Gaussian mask with fuzzy edges or a mask with hard edges) to mask pixels of the background image overlaid by the design asset within the improved layout 316 (leaving other pixels unmasked). In some cases, the design harmonization system 102 applies the asset mask 322 to mask all pixels not overlaid by the design asset and to mask the non-overlaid pixels instead.

As further shown, the design harmonization system 102 performs fractal noise injection 324. Specifically, the design harmonization system 102 injects fractal noise into pixels of the background image overlaid by the design asset (e.g., the masked pixels or the unmasked pixels, depending on the type of binary mask applied). The design harmonization system 102 injects fractal noise to improve visibility and contrast of a design asset due to the impacts of fractal noise on the diffusion process when applying the diffusion neural network 332. Indeed, diffusion models tend to recreate more creatively for areas or pixel regions that have noise injected to forget or obfuscate previously observed data.

In addition, the design harmonization system 102 performs color injection 326. Specifically, the design harmonization system 102 injects chromatic information into pixels of the background image overlaid by the design asset (e.g., the masked pixels or the unmasked pixels, depending on the type of binary mask applied). For example, the design harmonization system 102 injects chromatically opposite color data determined based on the color of a design asset within the improved layout 316 and/or within the initial digital design 306. Determining chromatically opposite color data is described in further detail below with reference to subsequent figures.

Further, the design harmonization system 102 performs luminance injection 328. Specifically, the design harmonization system 102 injects luminance into pixels of the background image overlaid by the design asset (e.g., the masked pixels or the unmasked pixels, depending on the type of binary mask applied). To inject luminance, the design harmonization system 102 utilizes a luminance injection algorithm to modify pixel values of pixels overlaid by the design asset. By injecting luminance, the design harmonization system 102 decreases salience of the modified pixel region, thereby improving readability and harmony of the design asset.

By performing the fractal noise injection 324, the color injection 326, and the luminance injection 328, the design harmonization system 102 generates a modified background image 330 that includes modified pixels in a region overlaid by a design asset (as indicated by the improved layout 316). As further illustrated in FIG. 3, the design harmonization system 102 utilizes a diffusion neural network 332 to generate a modified digital design 334 from the modified background image 330. Indeed, the diffusion neural network 332 processes the modified background image 330 as guided by the asset mask 322, the adaptive strength 320, and the prompt cleaning 318 to denoise a noise vector to converge on a vector for the modified digital design 334 with a design asset overlaid on modified background pixels. In some cases, the diffusion neural network 332 is a diffusion-based editing neural network, such as an SDEdit model as described by Chenlin Meng et al in *SDEdit: Guided Image Synthesis and Editing with Stochastic Differential Equations*, Int'l Conf. on Learning Representations (2021). In other cases, the diffusion neural network 332 is a different diffusion-based editing neural network, such as a DiffEdit model as described by Guillaume Couairon et al. in *DiffEdit: Diffusion-Based Semantic Image Editing with Mask Guidance*, arXiv: 2210.11427 (2022).

As also shown in FIG. 3, the design harmonization system 102 performs content aware correction 336. To elaborate, the design harmonization system 102 performs the content aware correction 336 by using a contrast correction algorithm to detect and correct contrast problems within the modified digital design 334. For instance, the design harmonization system 102 implements a two-part contrast correction algorithm where the first part detects a contrast problem, and the second part corrects the contrast problem. In some cases, the contrast correction algorithm utilizes the position of a bounding box for the design asset, font characteristics associated with the design asset (e.g., font type, font size, and font color), and the text characters used within the design asset. In addition, the contrast correction algorithm determines a color palette for colors of pixels within the background image that are overlapped by the design asset. From this information, the design harmonization system 102 utilizes the contrast correct algorithm to determine contrast ratios and to modify the color of the design asset according to the contrast ratios. In applying the contrast correction algorithm, the design harmonization system 102 generates a (further) modified digital design 338. Additional detail regarding the contrast correction algorithm is provided below with reference to subsequent figures.

Figure 4:
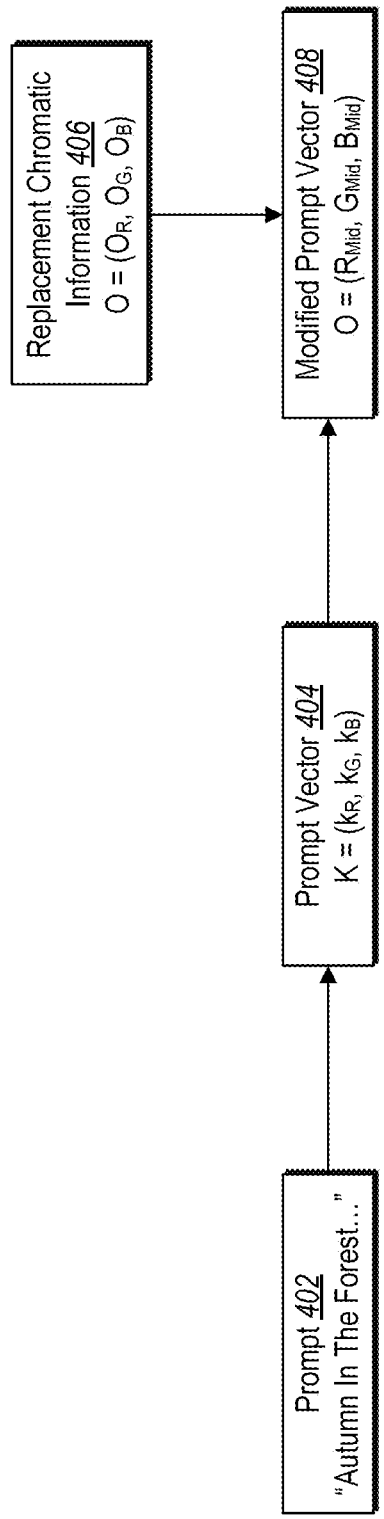
FIG. 4 illustrates an example diagram of prompt cleaning to generate a modified prompt vector in accordance with one or more embodiments.

As noted above, in certain embodiments, the design harmonization system 102 performs prompt cleaning to guide or improve the diffusion process in generating a modified digital design using a diffusion neural network. In particular, the design harmonization system 102 cleans or modifies prompt data of a text prompt to alter color information for improving the denoising process. FIG. 4 illustrates an example diagram for prompt cleaning in accordance with one or more embodiments.

As illustrated in FIG. 4, the design harmonization system 102 accesses, receives, generates, determines, or identifies a text prompt 402. In some cases, the design harmonization system 102 receives the text prompt 402 from a client device as a textual description of visual attributes of a digital design, including background image appearance (e.g., colors, objects, and style of the background image) and digital asset appearance (e.g., colors, style, size, and placement). In other cases, the design harmonization system 102 generates the text prompt 402 from an initial digital design using a captioning model to generate a textual description of the design.

As further illustrated in FIG. 4, the design harmonization system 102 generates, encodes, or extracts a prompt vector 404 from the text prompt 402. For example, the design harmonization system 102 extracts the prompt vector 404 that includes encoded data for the visual attributes of the corresponding digital design, including color information for the background image and/or for the design asset. In some situations, the chromatic information in the text prompt 402 (or the prompt vector 404) hinders convergence of the denoising process of a diffusion neural network towards an image that boosts readability or visibility of a design asset. Additionally, the more chromatic information contained in the text prompt 402 (or the prompt vector 404), the more difficult it is for the diffusion neural network to improve readability of the design asset through contrast and to create high emphasis of the design asset.

For these reasons, the design harmonization system 102 further generates a modified prompt vector 408 by cleaning the prompt vector 404 of chromatic information (e.g., by removing the chromatic information and/or the luminance information) and replacing the chromatic information with replacement chromatic information 406. To determine or generate the replacement chromatic information 406, the design harmonization system 102 determines a color that is chromatically opposite to the color of the design asset. To elaborate, the design harmonization system 102 uses a three-dimensional binary search in a color space (e.g., an RGB space where each value ranges from 0 to 255) using a particular distance calculation. Specifically, the design harmonization system 102 utilizes the CIELAB ΔE* distance in the 2000 formulation, as described by Guarav Sharma et al. in *The CIEDE2000 Color-Difference Formula: Implementation Notes, Supplementary Test Data, and Mathematical Observations*, Color Research & Application: Endorsed by Inter-Society Color Council, the Colour Group (Great Britain), Canadian Society for Color, Color Science Association of Japan, Dutch Society for the Study of Color, The Swedish Colour Centre Foundation, Colour So, vol. 30, pathogenicity prediction. 21-30 (2005). The design harmonization system 102 thus determines the distances between all points for each color channel and selects a point where the difference is maximal.

More precisely, the design harmonization system 102 utilizes a color replacement algorithm to determine the chromatic information 406 for replacing within the prompt vector 404 to thereby generate the modified prompt vector 408. In some embodiments, the color replacement algorithm involves calculating the opposite color $O=(o_R, o_G, o_B)$ for a design asset that has a dominant color $D=(d_R, d_G, d_B)$. Specifically, the color replacement algorithm includes the following steps or processes for a color $K=(k_R, k_G, k_B)=(k_i)_{i \in C, C=\{R,G,B\}}$:

$i_{min} = 0, i_{max} = 255, i \in C$ while $\max_{i \in C}(i_{max} - i_{min}) > \zeta$ $i_{mid} = \frac{i_{max} - i_{min}}{2}, i \in C$ $\Psi_{(p_i)_{i \in C}} = \Delta E(\pi_{CIELAB}(D), \pi_{CIELAB}(X))$ where $X = (x_i)_{i \in C}, x_i = \frac{i_{min} + (-1)^{p_i} \cdot i_{max}}{2}, p_i \in \{0,1\}$ Let $(s_i)_{i \in C}$ be the triplet for which $\Psi_{(s_i)_{i \in C}} \geq \Psi_{(p_i)_{i \in C}} \forall p_i \in \{0,1\}$ $i_{min} \begin{cases} i_{mid}, s_i = 0 \\ i_{min}, s_i = 1 \end{cases}, i_{max} = \begin{cases} i_{mid}, s_i = 1 \\ i_{max}, s_i = 0 \end{cases}, i \in C$ $O = (o_R, o_G, o_B) = (R_{mid}, G_{mid}, B_{mid})$ where $\Delta E(\cdot, \cdot)$ is the CIELAB ΔE* distance in the 2000 formulation, $\pi_{CIELAB}(\cdot)$ is the projection in the CIELAB color space of a color in the RGB space, and where $\zeta$ is the maximum allowed error (in our case $10^{-3}$, and is obtained after a maximum of 18 iterative loops). In applying the color replacement algorithm, the design harmonization system 102 replaces all the chromatic information from the text prompt 402 (represented mathematically as P) is replaced with the replacement chromatic information 406 (represented mathematically as O). In some embodiments, the design harmonization system 102 performs a maximum number (e.g., 18) of loops of the color replacement algorithm to obtain the replacement chromatic information 406.

Figure 5A:
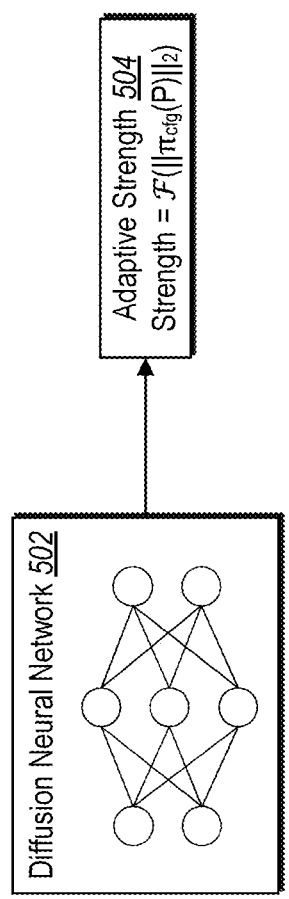
FIG. 5A illustrates an example diagram for determining an adaptive strength of a diffusion neural network in accordance with one or more embodiments.

As indicated above, in one or more embodiments, the design harmonization system 102 determines an adaptive strength for a diffusion neural network. In particular, the design harmonization system 102 determines an adaptive strength that calibrates or governs the diffusion process of a diffusion neural network. FIG. 5A illustrates an example diagram for determining an adaptive strength in accordance with one or more embodiments.

As illustrated in FIG. 5A, the design harmonization system 102 determines an adaptive strength 504 for a diffusion neural network 502. Indeed, the design harmonization system 102 determines the adaptive strength 504 to adapt the strength or aggressiveness of the diffusion process (e.g., the denoising) of the diffusion neural network 502 in generating a modified digital design. The diffusion strength slider varies with changes to a text prompt, and it is passive at seed. This means that, on certain text prompts, the diffusion process of the diffusion neural network 502 is more aggressive than on others, and the strength Is not uniform. The reason for this behavior Is that the distance between a prompt vector extracted from a text prompt and the center free guidance in the hypersphere varies.

Accordingly, the design harmonization system 102 resolves the discrepancies in diffusion strength by calibrating, adapting, or determining the adaptive strength 504 according to the norm of the prompt vector (e.g., the projection of the prompt) in latent space, as given by:

$$\text{strength} = \mathcal{F}(\|\pi_{cfg}(P)\|_2)$$

where $\mathcal{F}$ is a simple function $f: \mathbb{R} \to [0,1]$ that approximates the strength for any norm of a prompt P projected in the latent space of the guidance free classifier of the diffusion model, with projector $\pi_{cfg}$. Accordingly, the design harmonization system 102 determines and utilizes the adaptive strength 504, as determined by the function $\mathcal{F}$, to guide the diffusion neural network 502 in its diffusion process to generate a modified digital design according to an aggressiveness that adapts to the specific text prompt used as a source for generating the design.

For the design harmonization system 102, $\mathcal{F}$ is a support vector regression trained on a number of (e.g., 14) data points. Indeed, in some embodiments, the design harmonization system 102 trains $\mathcal{F}$ to determine the adaptive strength 504 of the diffusion neural network 502. Specifically, the design harmonization system 102 generates training data for the 14 data points mentioned above from 28 input images generated from 14 text prompts using 2 seeds. For each prompt, the design harmonization system 102 determines the projection norm in the free guidance classifier latent space (where the norms represent X). For these 28 images, the design harmonization system 102 applies a diffusion process of the diffusion neural network 502 with the strength fixed between 0 and 1. In some embodiments, the design harmonization system 102 generates 308 images with strengths $s \in \{0, 0.1, 0.2, \ldots 0.9, 1\}$. The design harmonization system 102 further selects (or provides for manual selection) the best strengths for each prompt (the best strengths represent Y). Finally, the design harmonization system 102 trains $\mathcal{F}$ using X data and Y labels.

Figure 5B:
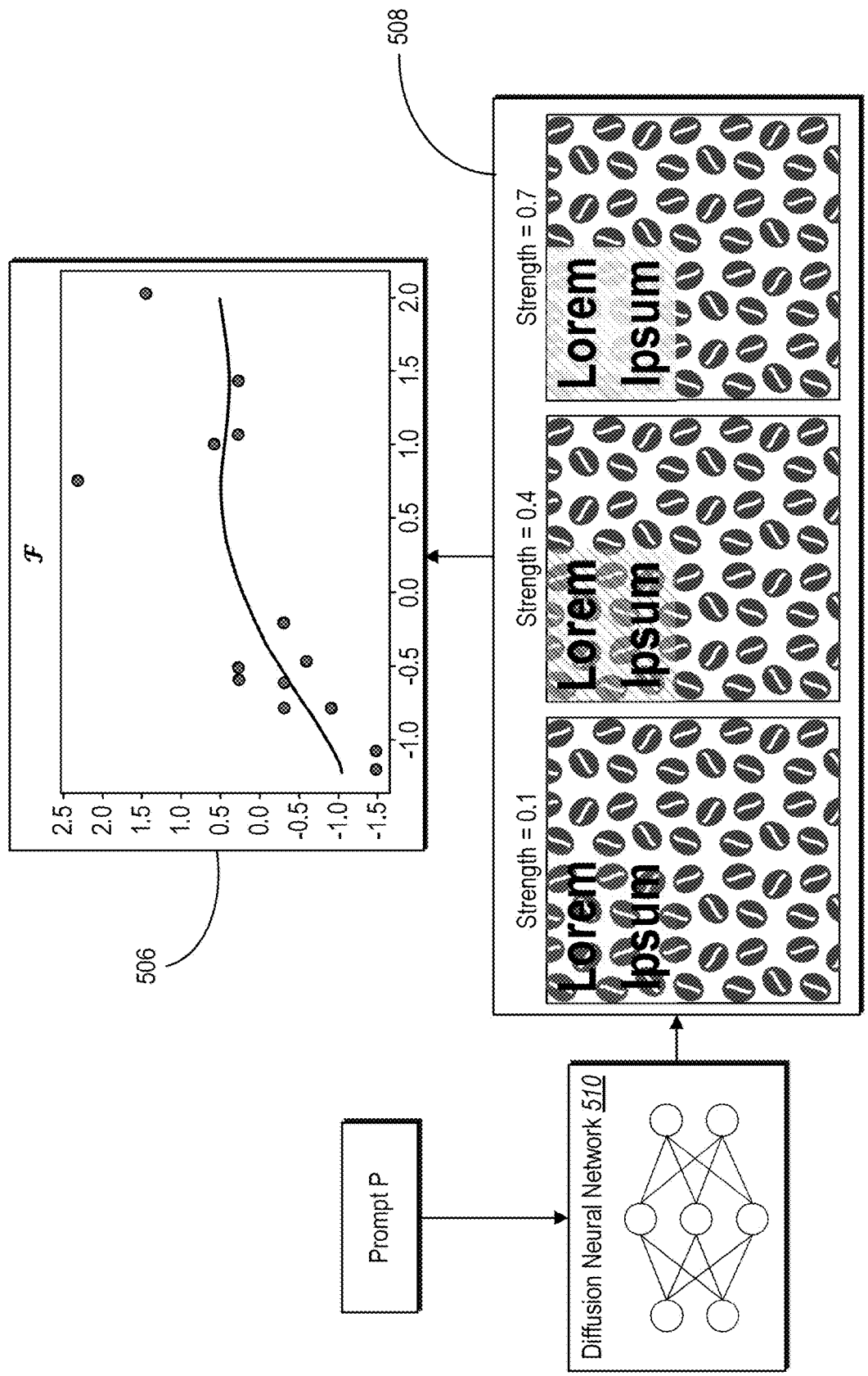
FIG. 5B illustrates an example regression function trained on generated designs for determining an adaptive strength in accordance with one or more embodiments.

As just mentioned, in certain embodiments, the design harmonization system 102 trains a function to determine adaptive strengths of a diffusion neural network. In particular, the design harmonization system 102 trains a support vector regression to learn adaptive strengths from digital designs generated by a diffusion neural network. FIG. 5B illustrates an example support vector regression function trained to determine adaptive strengths from generated designs in accordance with one or more embodiments.

As illustrated in FIG. 5B, the design harmonization system 102 utilizes a diffusion neural network 510 to generate a set of digital designs 508. In particular, the diffusion neural network 510 generates the set of digital designs 508 from the same prompt P="coffee beans, close up, macro, moody light, from above, natural colors." As shown, the diffusion neural network 510 generates the set of digital designs 508 by varying the adaptive strength s to yield different results. For instance, the diffusion neural network 510 generates the set of digital designs 508 represented by:

$$\underbrace{\omega(P, I, s=0)}_{O_0}, \underbrace{\omega(P, I, s=0.1)}_{O_1}, \ldots, \underbrace{\omega(P, I, s=0.9)}_{O_9} \text{ and } \underbrace{\omega(P, I, s=1)}_{O_{10}}$$

where $\omega(\cdot,\cdot)$ represents the diffusion neural network 510, P represents the input prompt (the same for all designs in the set of digital designs 508), I represents an initial digital design (the same for all designs in the set of digital designs 508), and s represents the adaptive strength. In some cases, s is an intensity measure that designates the intensity or aggressiveness by which the diffusion neural network 510 performs the diffusion or denoising process, where s varies with input designs I (e.g., s is a parameter desired from I). In these or other cases, the diffusion neural network 510 is a DiffEdit network or an SDEdit network, as cited above.

From the set of digital designs 508, represented by $O_0$, $O_1, \ldots O_{10}$, the design harmonization system 102 determines a range of adaptive strengths s. Indeed, the design harmonization system 102 determines a range of adaptive strengths s that result in the generated designs $O_i \in 0$, 10 and further selects (or receives input from a client device selecting) one or more designs that yield desired aesthetic results.

As shown in FIG. 5B, the design harmonization system 102 selects (or receives input from a client device selecting) the adaptive strength s=0.4 from among the displayed options. Particularly, the design harmonization system 102 determines that the strength s=0.1 results in a design where the overlaid design asset is hard to read (resulting from a diffusion process that is too weak) and that the strength s=0.7 results in a design where the region of the background image overlaid by the design asset is too heavily modified and visually jarring (resulting from a diffusion process that is too aggressive).

Accordingly, the design harmonization system 102 selects the adaptive strength s=0.4 as a training value for training a support vector regression function to learn to determine adaptive strengths from input prompts. In addition to the adaptive strength training value, the design harmonization system 102 further determines a training value of the projection norm in embedding space $\|\pi_{cfg}(P)\|_2 = 26.1255$. The design harmonization system 102 thus builds a set of training data X and Y for the support vector regression function, where the projection norms of input prompts make up X (e.g., $\|\pi_{cfg}(P)\|_2 = 26.1255 \in X$) and the adaptive strength values selected to produce desired results make up Y (e.g., $s=0.4 \in Y$). In some embodiments, X and Y are not mean 0 and standard deviation 1, so the design harmonization system 102 further normalizes X and Y before training (and de-normalizes at test time).

As further illustrated in FIG. 5B, the design harmonization system 102 utilizes the training data X and Y to train a support vector regression function $\mathcal{F}$, represented by the graph 506. Because support vector regressions excel in high dimensional space, are robust to overfitting, and handle nonlinear relationships well, the design harmonization system 102 trains $\mathcal{F}$ to converge on adaptive strength values from input prompts. As shown, $\mathcal{F}$ is effective at capturing complex data patterns, is robust to outliers, and provides good generalization. Indeed, the graph 506 includes a couple outlier values, but $\mathcal{F}$ nevertheless fits the data (X, Y) effectively without overfitting to the outliers. In some cases, the design harmonization system 102 selects a particular kernel type for $\mathcal{F}$, such as a radial basis function kernel, a polynomial kernel, or a Gaussian kernel. As shown, the design harmonization system 102 utilizes a radial basis function kernel for non-linearity. The design harmonization system 102 thus trains $\mathcal{F}$ to select or determine adaptive strength values based on input prompts (and/or input designs).

Figure 6A:
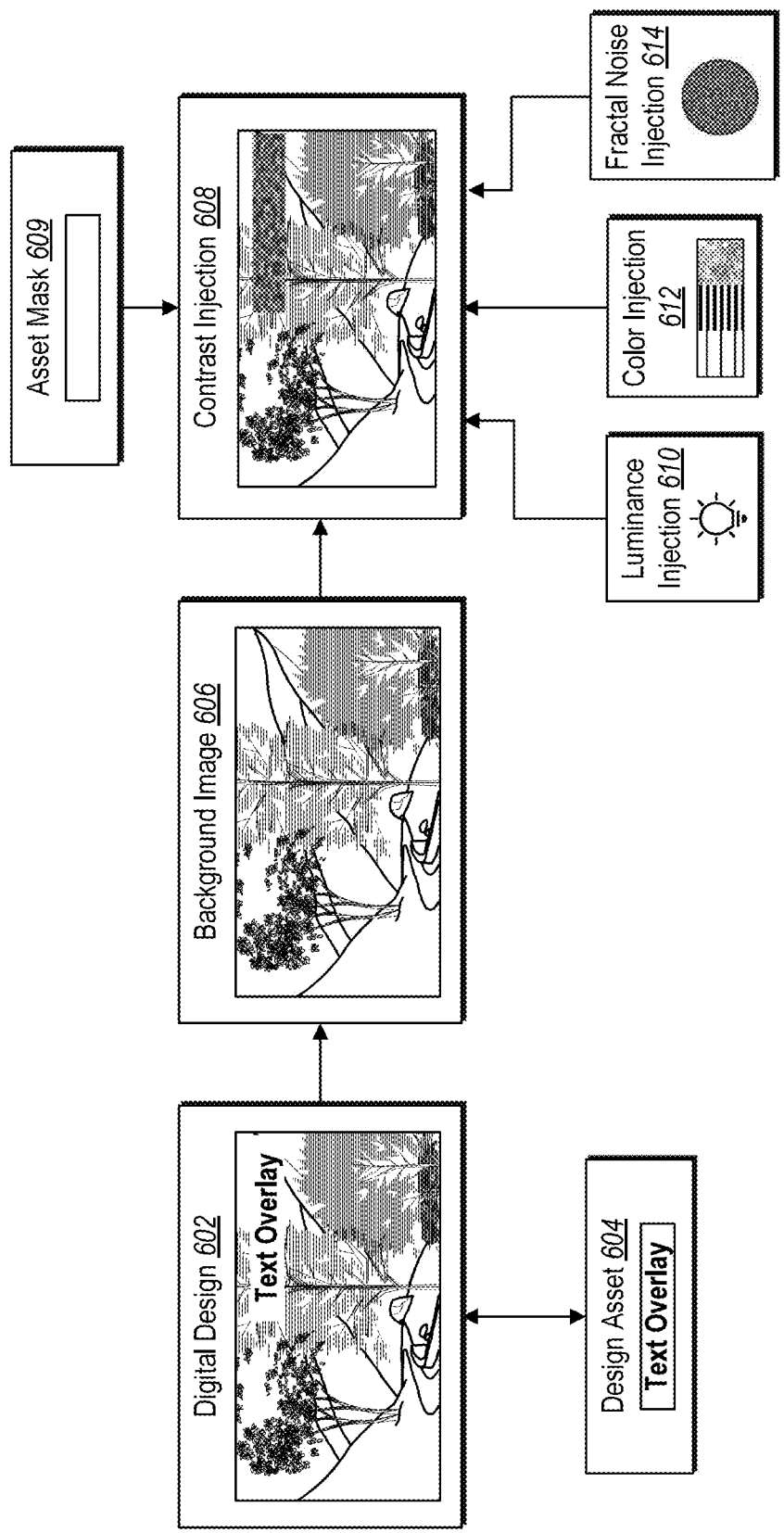
FIGS. 6A-6B illustrate example diagrams for an asset harmonization process in accordance with one or more embodiments.
Figure 6B:
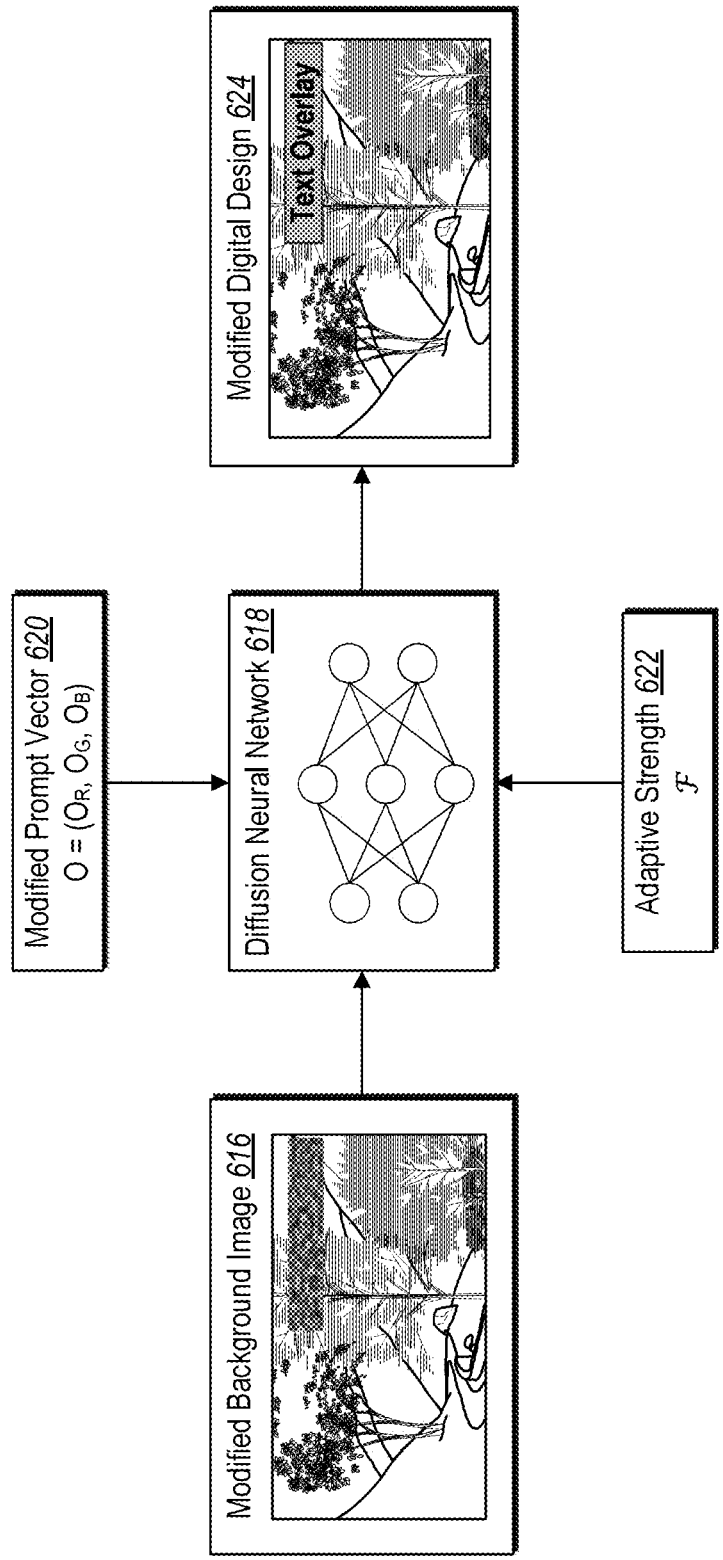

As mentioned above, in certain described embodiments, the design harmonization system 102 utilizes or implements asset harmonization processes. In particular, the design harmonization system 102 perform a dual phase asset harmonization process that involves injecting contrast data and applying an iterative diffusion process (e.g., via a diffusion neural network). FIGS. 6A-6B illustrate example diagrams for the dual phase asset harmonization process in accordance with one or more embodiments, where FIG. 6A depicts a first phase for injecting contrast data, and FIG. 6B injects depicts a second phase for applying a diffusion neural network to generate a modified digital design.

As illustrated in FIG. 6A, the design harmonization system 102 determines, generates, or receives a digital design 602. In particular, the design harmonization system 102 generates or receives a digital design 602 that includes a design asset 604 and a background image 606. As shown, the design asset 604 is a text graphic that says "Text Overlay" within a rectangular box. As also shown the background image 606 is a forest scene along a trail with hills in the distance.

As further illustrated in FIG. 6A, the design harmonization system 102 performs a contrast injection 608. To elaborate, the design harmonization system 102 performs the contrast injection 608 to inject contrast data into the background image 606. In performing the contrast injection 608, the design harmonization system 102 improves the visibility or readability of the design asset 604 when overlaid on a modified version of the background image 606 (e.g., as a modified digital design). As shown, the design harmonization system 102 injects three different types of contrast data into pixels of the background image 606. Specifically, the design harmonization system 102 injects the contrast data into pixels indicated by an asset mask 609 (e.g., a mask whose area and position on the background image 606 is determined based on a proposed pixel region generated by a region proposal model).

As part of the contrast injection 608, the design harmonization system 102 performs a luminance injection 610. In particular, the design harmonization system 102 injects luminance into the overlaid (or masked or unmasked, depending on the orientation of the mask) pixels of the background image 606. Injecting luminance directly impacts the contrast calculation between the design asset 604 and the background image 606. Moreover, an increase in luminance in any direction also represents a decrease in the salience of the overlaid/masked pixels. In some embodiments, the design harmonization system 102 performs the luminance injection 610 according to the following luminance injection algorithm:

$$\Delta L = \text{sgn}(\mathcal{L}(R_A, G_A, B_A) - 0.5)$$

$$\frac{1}{5 - 3.75|\mathcal{L}(R_A, G_A, B_A) - \mathcal{L}(R_I, G_I, B_I)|} \in [-0.8, -0.2] \cup [0.2, 0.8]$$

$$L(R, G, B) = 0.2126 \cdot \tau(R) + 0.7152 \cdot \tau(G) + 0.0722 \cdot \tau(B),$$

$$\tau(K) = \begin{cases} \dfrac{K}{12.92'} & K \le 0.03928 \\ \left(\dfrac{K + 0.055}{1.055}\right)^{2.4}, & \text{otherwise} \end{cases}$$

where $(R_A, G_A, B_A)$ represents the color of the design asset in RGB color space, $(R_I, G_I, B_I)$ represents the average color of the image portion with which the design asset overlaps in RGB color space and $$\text{sgn}(x) = \frac{|x|}{x}$$

is the sign function. $\Delta L$ represents the amount of luminance that is injected into the design asset region of interest (e.g., a luminance change). The greater the luminance difference between the two entities (e.g., the asset luminance and the overlaid pixel luminance), the less the need to change the luminance, and vice versa. In addition, the design harmonization system 102 adjusts luminance in the negative direction—that is, the area of the background image 606 corresponding to the design asset 604 if the brightness of the design asset is on the luminous spectrum and vice versa.

Using the above luminance injection algorithm, the design harmonization system 102 determines a luminance of the design asset 604 as well as a luminance of the overlaid pixels in the background image 606. In addition, the design harmonization system 102 determines a sign of the direction of the luminance (e.g., of a luminance vector) of the asset. The design harmonization system 102 further determines a linear transformation that gives the difference between the asset luminance and mean luminance of the overlaid pixels.

As further illustrated in FIG. 6A, the design harmonization system 102 performs further contrast injection 608 by implementing color injection 612. More specifically, the design harmonization system 102 injects color into the overlaid pixels of the background image 606 to assist in highlighting the design asset 604 that will overlap a region edited by a diffusion neural network. Additionally, by injecting color, the design harmonization system 102 modifies the overlaid area by decreasing the salience and implicitly highlighting the design asset 604 that will by emphasized.

The design harmonization system 102 performs the color injection 612 by injecting contrasting color as follows. First, the design harmonization system 102 determines a chromatically opposite color as described above in relation to the prompt cleaning. The design harmonization system 102 further utilizes the chromatically opposite color data to guide a color injection model that performs coloring with local points, as described by Jooyeol Yun et al. in *iColoriT: Towards Propagating Local Hints to the Right Region in Interactive Colorization by Leveraging Vision Transformer*, Proceedings of IEEE Conf. on Applications of Computer Vision, pp. 1787-96 (2023). To elaborate, the design harmonization system 102 determines or generates local points using a semantic segmentation model, such as the model described by Peng Wang et al. in *ONE-PEACE: Exploring One General Representation Model Toward Unlimited Modalities*, arXiv: 2305.11172 (2023). The design harmonization system 102 further identifies and injects color at local points (e.g., local pixels) where only the objects with an area of at least a threshold amount (e.g., 20%) of the mask area and a threshold confidence (e.g., 80%) ($T_1$).

In addition, the design harmonization system 102 further injects color into the entire overlaid pixel region of the background image 606 under the asset mask 609. Specifically, the design harmonization system 102 injects the chromatically opposite color into the overlaid region to speed up uniformity and to implicitly decrease salience. In some cases, the amount of injected color is inversely proportional to the amount of color already existing in the overlaid/masked region ($T_2$). In one or more embodiments, the design harmonization system 102 utilizes the following color injection algorithm:

$$\Delta H = \underbrace{\Phi(M|\{(x, y)|\Gamma(M, O) \ge 0.8, \mathcal{A}(O) \ge 0.2\mathcal{A}(M)\})}_{T_1} + M \cdot C \cdot \underbrace{\frac{1}{5 - 3.75 \Sigma_{\pi_{HSV}(M(i,j) \in v(c)}} \frac{(i,j) \in M}{1}}_{T_2}$$

where $\Phi(\bullet|\bullet)$ is the color injection model/algorithm in which the first parameter is the recoloring image (e.g., mask M—the asset mask 609) and the second parameter is a set of local points (represents the condition and is optimal). $\Gamma(M, O)$ is the score of the semantic segmentation model for the mask M and the identified object O, $\mathcal{A}(\bullet)$ is the surface function. Additionally, $\pi_{HSV}(\bullet)$ is the projection in HSV space from the original RGB space, $\mathcal{V}(\bullet)$ represents the neighborhood of a color and is implemented as the inRange function. Further, $\overrightarrow{\phantom{n}}$ represents the operation of normalizing a vector $$\left(\text{namely } \hat{v} = \frac{v}{\max(\|v\|_2, \epsilon)}, \epsilon = 10^{-12}\right).$$

In a non-restrictive way, the design harmonization system 102 can use several contrasting colors, but since many design assets are monochrome, only a single color is often suitable.

As further illustrated in FIG. 6A, the design harmonization system 102 performs fractal noise injection 614. More particularly, the design harmonization system 102 injects fractal noise to impact the diffusion process of a diffusion neural network by helping to forget what has been previously observed by the network. In some cases, diffusion neural network recreate more creatively in areas that have fractal noise injected. Accordingly, the design harmonization system 102 injects accentuates the luminance injection 610 and the color injection 612 by injecting fractal noise, and further diminishes the impact of already existing content in the background image 606. In some cases, the design harmonization system 102 utilizes a fractal noise injection 614 such as that described by Marian Lupascu et al. in *A Fast Text-Driven Approach for Generating Artistic Content*, ACM SIGGRAPH 2022, pp. 1-2 (2022).

As mentioned above, FIG. 6B illustrates the second phase of the dual phase asset harmonization. Specifically, as illustrated in FIG. 6B, the design harmonization system 102 generates a modified background image 616 via the contrast injection 608 described in relation to FIG. 6A. Indeed, the design harmonization system 102 generates the modified background digital image by injecting luminance, color, and fractal noise into a region of pixels overlaid by a design asset and/or indicated by an asset mask. Additionally, the design harmonization system 102 utilizes a diffusion neural image 618 to generate a modified digital design 624 from the modified background image 616.

To elaborate, the design harmonization system 102 utilizes the diffusion neural image 618 (e.g., an SDEdit model or a DiffEdit model) to augment the modified background image 616 according to a modified prompt vector 620 and an adaptive strength 622. In some cases, the design harmonization system 102 utilizes an SDEdit mode to totally modify the modified background image 616. In other cases, the design harmonization system 102 utilizes a DiffEdt model to modify the modified background image 616 in areas around or within the asset mask. Indeed, the design harmonization system 102 utilizes the diffusion neural image 618 to denoise the contrast-injected pixels in the overlaid/masked region of the modified background image 616. For instance, the diffusion neural image 618 denoises according to the adaptive strength 622 which dictates or governs the aggressiveness of the denoising process. Using the adaptive strength 622 (determined as described above), the diffusion neural image 618 denoises to converge on the modified prompt vector 620 (obtained via prompt cleaning as described above) to thereby insert a modified design asset into the modified background image 616, resulting in the modified digital design 624.

Figure 7:
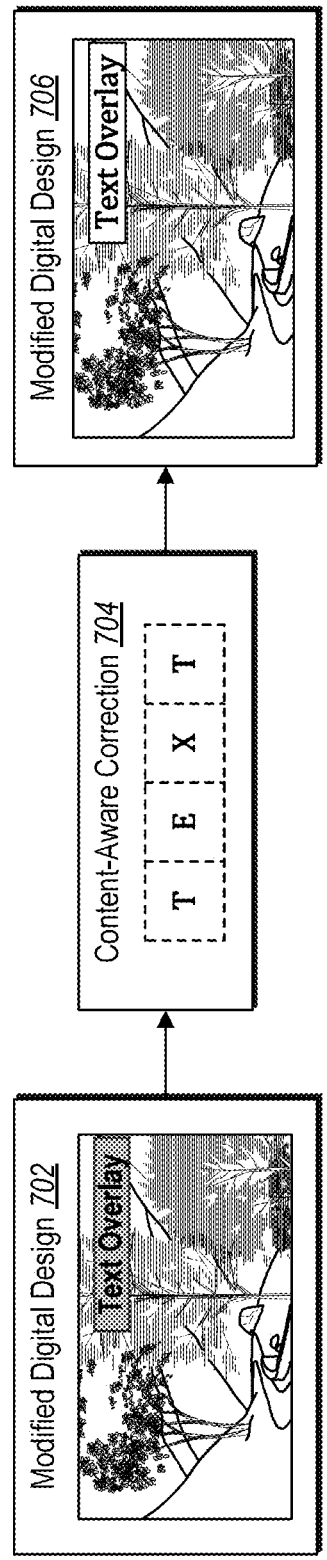
FIG. 7 illustrates an example diagram of a content aware correction in accordance with one or more embodiments.

As indicated above, in certain embodiments, the design harmonization system 102 performs content aware correction to further modify a modified digital design. In particular, the design harmonization system 102 applies a contrast correct algorithm to correct or modify contrast ratios between a design asset and a background image to further improve harmony and visibility. FIG. 7 illustrates an example diagram for performing content aware correction in accordance with one or more embodiments.

As illustrated in FIG. 7, the design harmonization system 102 generates a modified digital design 702. As described above, the design harmonization system 102 generates the modified digital design 702 using a diffusion neural network guided by an adaptive strength and a modified prompt vector, and further using a modified background image that include injected contrast data. As shown in FIG. 7, the design harmonization system 102 utilizes a content aware correction 704 to further modify the modified digital design 702 and generate the modified digital design 706.

To perform the content aware correction 704, the design harmonization system 102 utilizes a contrast correction algorithm that includes two parts. In the first part, the design harmonization system 102 detects contrast problems. In the second part, the design harmonization system 102 corrects the contrast problems. As part of detecting contrast problems, the design harmonization system 102 determines a color palette that includes a set of colors for pixels in a region of the background image overlapped by a glyph of the design asset. Indeed, the design harmonization system 102 identifies individual glyphs with a design asset of the modified digital design 702 and further determines or generates bounding boxes for the glyphs based on their size, location, and font type. The design harmonization system 102 further determines a mean glyph size across the glyphs of the design asset.

Additionally, the design harmonization system 102 crops the background image according to the bounding boxes for the asset glyphs. More specifically, the design harmonization system 102 generates a crop for each glyph, where the crop includes pixels directly overlapped by the bounding box for the corresponding asset glyph. In some cases, the design harmonization system 102 generates uniformly sized background image crops that are each the size of the mean bounding box size across the glyph-specific bounding boxes for the design asset. Notably, no prior rendering of the text is required which results in a fast, less expensive contrast correction algorithm. In some embodiments, however, the design harmonization system 102 can use a text renderer to render the text and crop the background image to size and shape according to each rendered glyph.

The design harmonization system 102 further determines a dominant color for each glyph-specific background image crop. For instance, the design harmonization system 102 extracts a dominant color by determining color weights for pixel values in a crop and comparing the color weights with a weight threshold. In some cases, the design harmonization system 102 determines a color to be dominant if its weight w in the crop/section is more than p, a hyperparameter set to 10.

Additionally, the design harmonization system 102 determines whether there is a legibility incompatibility for each crop. To elaborate, the design harmonization system 102 determines a color palette for a design asset by determine a set of colors used within the design asset of the modified digital design 702. In addition, the design harmonization system 102 compares each color of the color palette with extracted dominant colors for each of the sections/crops of the background image (underlying respective glyphs). The design harmonization system 102 further determines a contrast mismatch, and that the color is therefore incompatible, if a contrast ratio is higher than a contrast threshold ct. If the design harmonization system 102 determines that all colors of the asset palette are incompatible, then the design harmonization system 102 determines that the entire digital design is incompatible.

As noted, in some cases, the design harmonization system 102 utilizes a machine learning version of a contrast correction algorithm. Specifically, given an image section/crop underlying an asset glyph (or underlying an entire asset), along with the text, text attributes, and color palette of the design asset, the design harmonization system 102 generates a compatibility prediction whether the section/crop is compatible with the text or not. In some cases, the design harmonization system 102 utilizes a vision transformer to process an image section/crop, relying on its intrinsic patch-based processing. The vision transformer processes two input versions, one that includes only the image section/crop and one that includes both the image section/crop and the image section/crop with the text rendered on top.

In cases where the design harmonization system 102 determines a design is compatible, the design harmonization system 102 selects a most contrasting color from the color palette of the design asset to apply to the entire design asset (all of the glyphs). In some embodiments, the design harmonization system 102 does so if and only if an initial color of the asset (or the individual glyph) is incompatible. Otherwise, the design harmonization system 102 retains the initial color. In using colors from the palette, the design harmonization system 102 preserves harmony between the design asset and the background image.

In cases, where the design harmonization system 102 determines a design is incompatible, the design harmonization system 102 utilizes one or more effects to modify the digital design. For example, the design harmonization system 102 utilizes backing shapes and/or outlines to delineate a design asset from background image pixels. By placing a properly colored backing (e.g., a text effect) behind a design asset, the design harmonization system 102 separates the design asset (e.g., the text) from the background image. In some embodiments, the design harmonization system 102 selects a color for the colored backing as a color from the palette based on the CIELAB $\Delta E^*$ distance described above whose contrast ratio is above a threshold $\beta$ to ensure both legibility and harmony.

Figure 8:
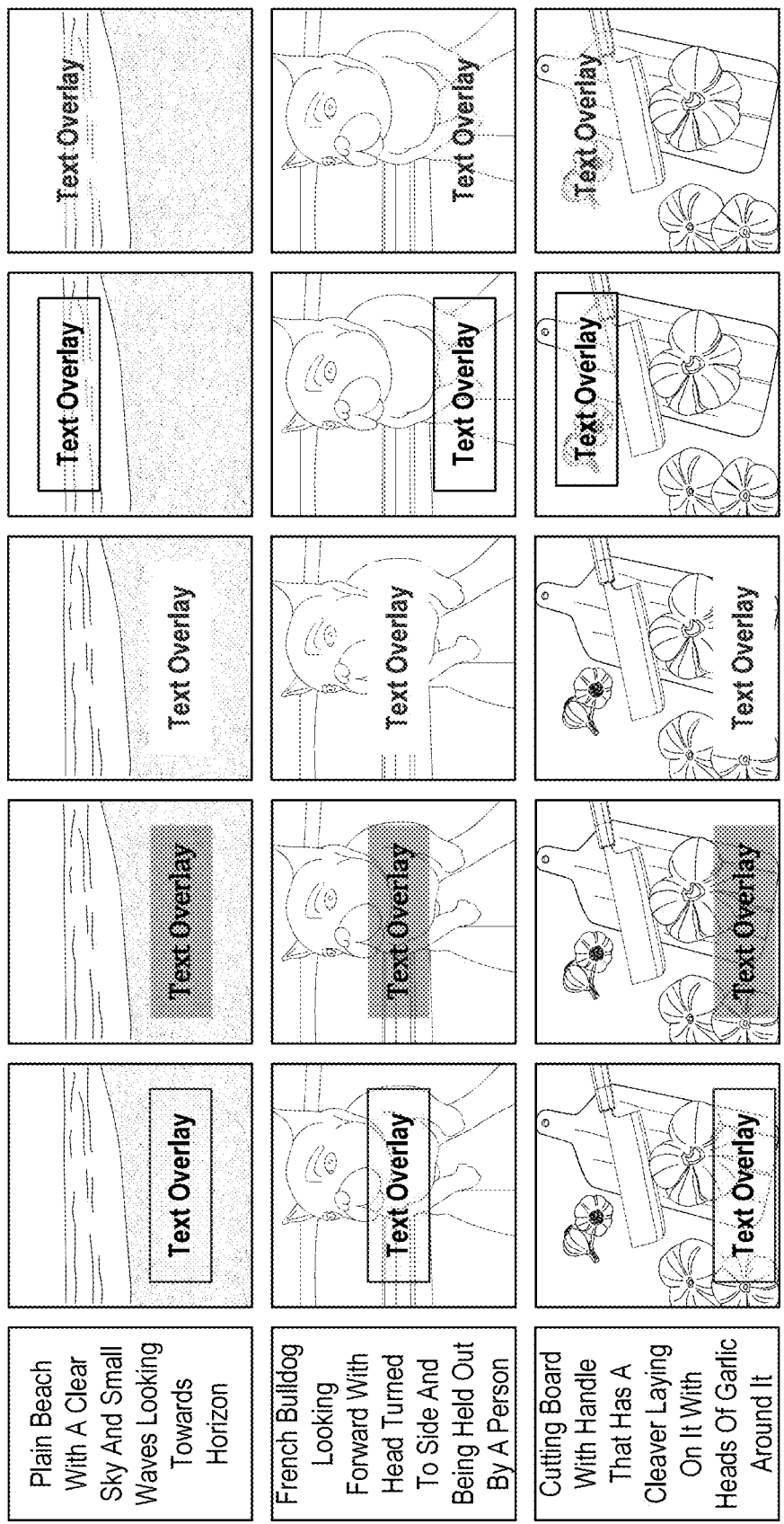
FIG. 8 illustrates an example table of modified digital designs generated via design variation in accordance with one or more embodiments.

As noted above, in certain described embodiments, the design harmonization system 102 performs design variation. To elaborate, the design harmonization system 102 performs a design variation to generate alternative modified digital designs. FIG. 8 illustrates an example table of modified digital designs generated via design variation in accordance with one or more embodiments.

As illustrated in FIG. 8, the first column in the table indicates a text prompt that the design harmonization system 102 uses to generate the corresponding modified digital design shown in the second column. In some embodiments, the design harmonization system 102 generates several different outputs (e.g., additional modified digital designs) from a single set of inputs (e.g., a text prompt and/or a digital design). As shown, in each row of the illustrated table, the design harmonization system 102 generates two additional modified digital designs (e.g., in the third column and the fourth column) from an initial digital design from a client device without implementing asset region proposal and generates the other two additional modified digital designs (e.g., in the fifth column and the sixth/last column) using asset region proposal.

In certain cases, the design harmonization system 102 generates modified digital design variations by altering content aware correction steps. For instance, the design harmonization system 102 utilizes a modified contrast correction algorithm by setting a color for the design asset that achieves the highest readability and contrast. In some cases, the design harmonization system 102 obtains colors at a distance 0.1 according to the CIELAB $\Delta E^*$ distance. As shown in the table of FIG. 8, the design harmonization system 102 generates four different variations of the modified digital design with variations in asset placement, asset color, and pixel region color for the masked/overlaid portion of the background image.

Figure 9:
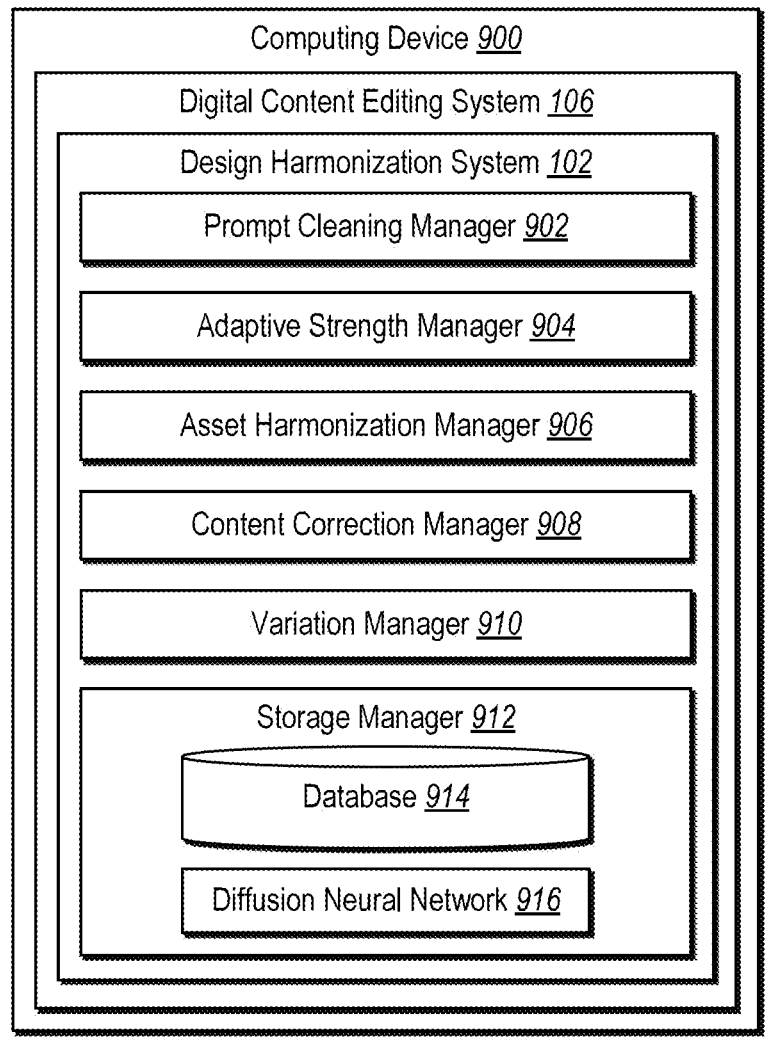
FIG. 9 illustrates an example schematic diagram of a design harmonization system in accordance with one or more embodiments.

Looking now to FIG. 9, additional detail will be provided regarding components and capabilities of the design harmonization system 102. Specifically, FIG. 9 illustrates an example schematic diagram of the design harmonization system 102 on an example computing device 900 (e.g., one or more of the client device 108 and/or the server(s) 104). As shown in FIG. 9, the design harmonization system 102 includes a prompt cleaning manager 902, an adaptive strength manager 904, an asset harmonization manager 906, a content correction manager 908, a variation manager 910, and a storage manager 912.

As just mentioned, the design harmonization system 102 includes a prompt cleaning manager 902. In particular, the prompt cleaning manager 902 cleans, modifies, generates, alters, or augments a text prompt associated with generating a digital design. For example, the prompt cleaning manager 902 extracts a prompt vector from a text prompt and cleans or removes color data (and luminance data) from the prompt vector, where the color data indicates pixel values for background image pixels and/or design asset pixels. In some cases, the prompt cleaning manager 902 generates a text prompt from an initial digital design provided by a client device.

As also shown, the design harmonization system 102 includes an adaptive strength manager 904. In particular, the adaptive strength manager 904 manages, determines, generates, adapts, adjusts, calibrates, or tunes an adaptive strength of a diffusion neural network. For example, the adaptive strength manager 904 determines an adaptive strength that adjusts on a per-prompt basis to augment the aggressiveness of a diffusion or denoising process of a diffusion neural network.

As further shown, the design harmonization system 102 includes an asset harmonization manager 906. In particular, the asset harmonization manager 906 manages, maintains, determines, adjusts, modifies, or calibrates asset harmonization for a design asset in relation to a background image of a digital design. For example, the asset harmonization manager 906 performs a dual phase harmonization process that involves injecting contrast data (e.g., luminance, color, and/or fractal noise) into a background image and using a diffusion neural network to generate a modified digital design from the background image (according to an asset mask indicated by a region proposal model and an adaptive strength).

Additionally, the design harmonization system 102 includes a content correction manager 908. In particular, the content correction manager 908 manages, determines, generates, or implements a content aware correction of a modified digital design. For example, the content correction manager 908 utilizes a contrast correction algorithm to modify content of a design asset (and/or a background image) to improve visibility and harmony based on colors of glyphs within the design asset and colors within glyph-specific sections or crops of the background image overlaid by the glyphs.

Further, the design harmonization system 102 includes a variation manager 910. In particular, the variation manager 910 manages, maintains, generates, or determines content variations for a modified digital design. For example, the variation manager 910 generates additional modified digital designs by varying content aware correction steps and/or other data involved in generating a modified digital design.

The design harmonization system 102 further includes a storage manager 912. The storage manager 912 operates in conjunction with the other components of the design harmonization system 102 and includes one or more memory devices such as the database 914 (e.g., the database 114) that stores various data such as digital designs, assets, contrast data, and other information. In some cases, the storage manager 912 also manages or maintains a diffusion neural network 916 for modifying or generating digital designs using one or more components of the design harmonization system 102 as described above.

In one or more embodiments, each of the components of the design harmonization system 102 are in communication with one another using any suitable communication technologies. Additionally, the components of the design harmonization system 102 are in communication with one or more other devices including one or more client devices described above. It will be recognized that although the components of the design harmonization system 102 are shown to be separate in FIG. 9, any of the subcomponents may be combined into fewer components, such as into a single component, or divided into more components as may serve a particular implementation. Furthermore, although the components of FIG. 9 are described in connection with the design harmonization system 102, at least some of the components for performing operations in conjunction with the design harmonization system 102 described herein may be implemented on other devices within the environment.

The components of the design harmonization system 102 include software, hardware, or both. For example, the components of the design harmonization system 102 include one or more instructions stored on a computer-readable storage medium and executable by processors of one or more computing devices (e.g., the computing device 900). When executed by the one or more processors, the computer-executable instructions of the design harmonization system 102 cause the computing device 900 to perform the methods described herein. Alternatively, the components of the design harmonization system 102 comprise hardware, such as a special purpose processing device to perform a certain function or group of functions. Additionally, or alternatively, the components of the design harmonization system 102 include a combination of computer-executable instructions and hardware.

Furthermore, the components of the design harmonization system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the design harmonization system 102 may be implemented as part of a stand-alone application on a personal computing device or a mobile device. Alternatively, or additionally, the components of the design harmonization system 102 may be implemented in any application that allows creation and delivery of content to users, including, but not limited to, applications in ADOBE® EXPERIENCE MANAGER and CREATIVE CLOUD®, such as PHOTOSHOP®, LIGHTROOM®, FIREFLY®, and INDESIGN®. "ADOBE," "ADOBE EXPERIENCE MANAGER," "CREATIVE CLOUD," "PHOTOSHOP," "LIGHTROOM," "FIREFLY" and "INDESIGN" are either registered trademarks or trademarks of Adobe Inc. in the United States and/or other countries.

FIGS. 1-9 the corresponding text, and the examples provide a number of different systems, methods, and non-transitory computer readable media for generating a digital design using a diffusion neural network according to improve visibility of a design asset while preserving harmony using an adaptive strength, prompt cleaning, region proposal, asset harmonization, and/or content aware correction. In addition to the foregoing, embodiments can also be described in terms of flowcharts comprising acts for accomplishing a particular result. For example, FIGS. 10-12 illustrate flowcharts of example sequences or series of acts in accordance with one or more embodiments.

Figure 10:
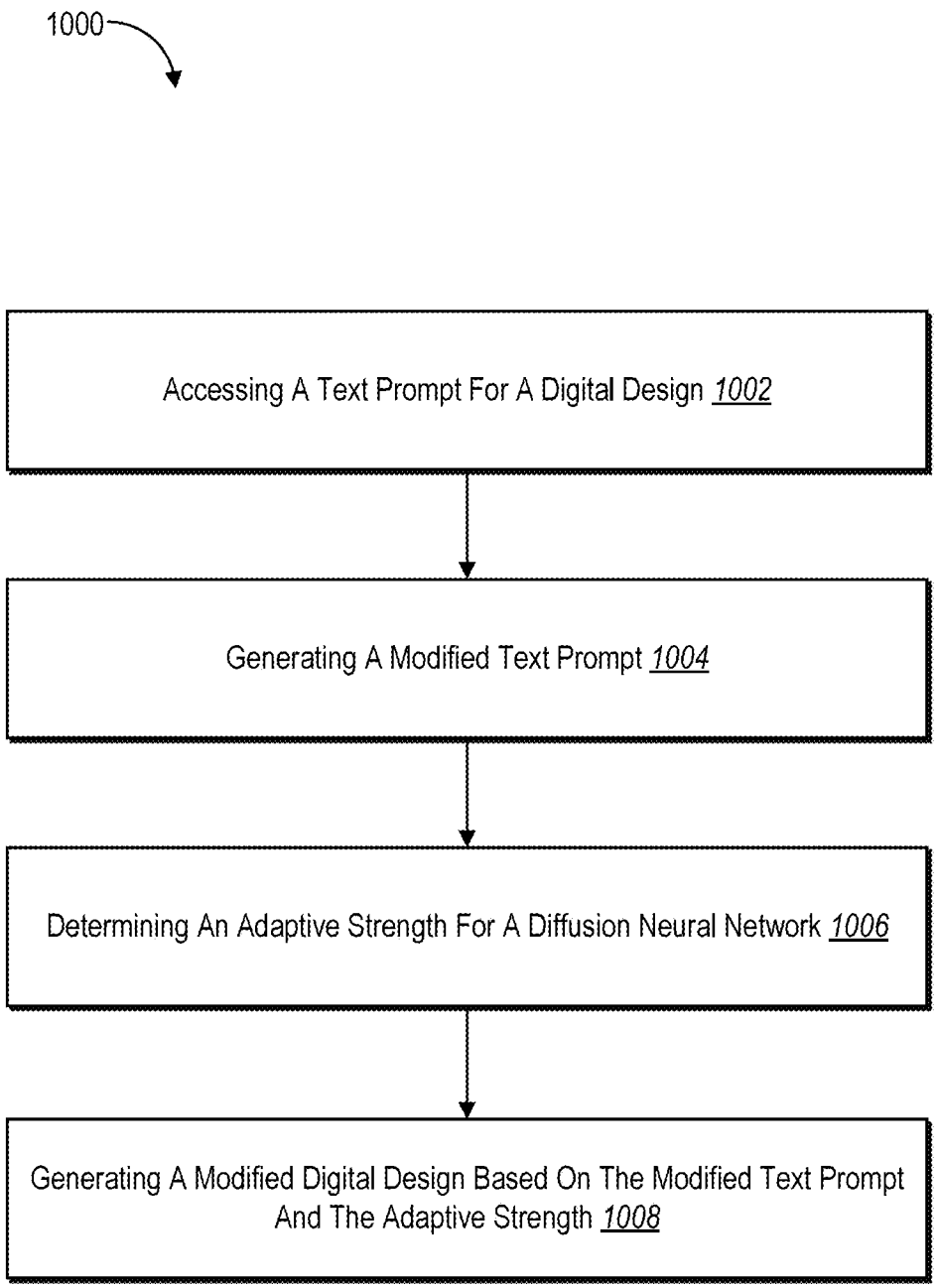
FIG. 10 illustrates an example flowchart of a series of acts for generating a modified digital design using a diffusion neural network based on modifying chromatic information and determining an adaptive strength in accordance with one or more embodiments.
Figure 11:
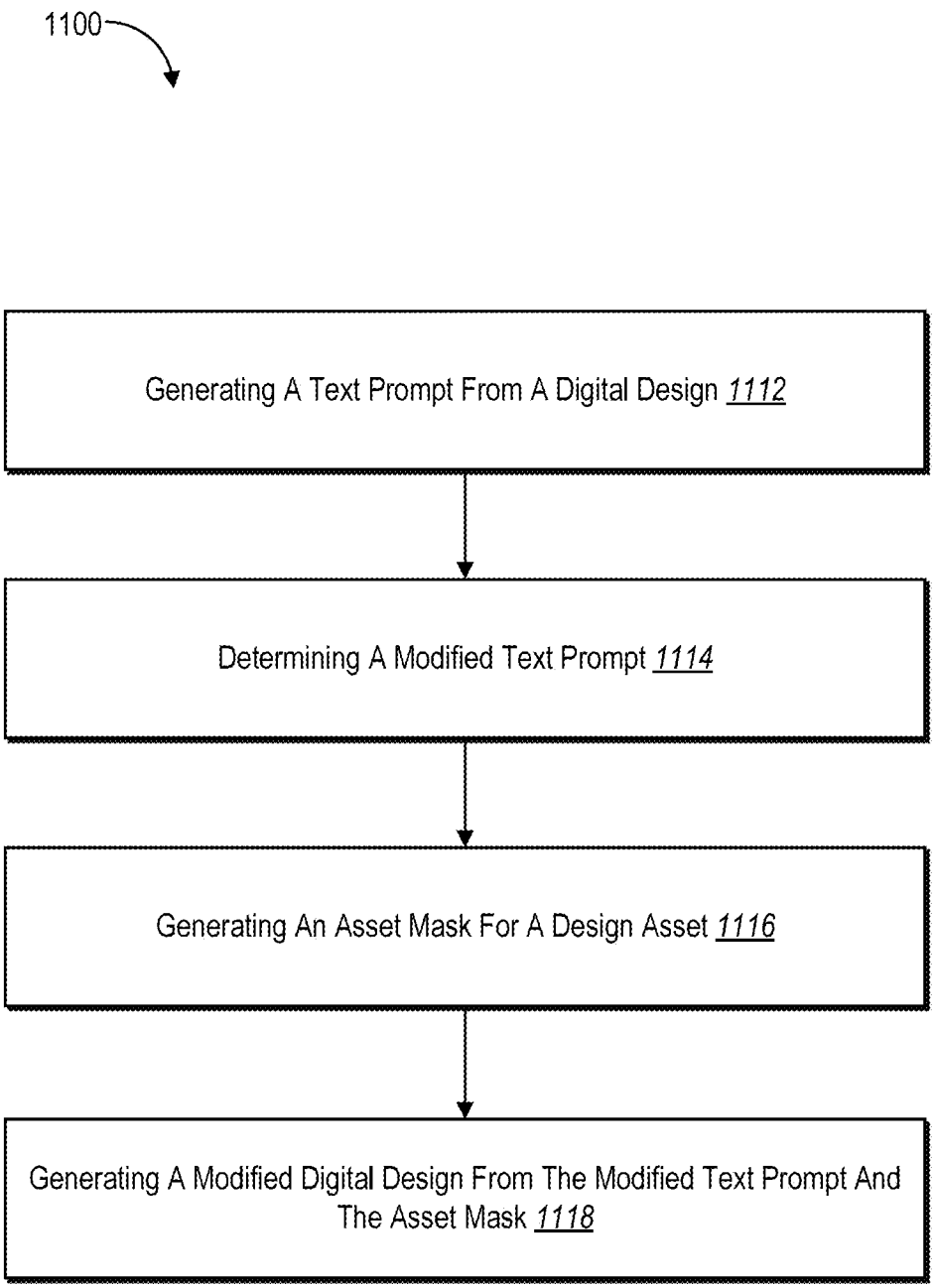
FIG. 11 illustrates an example flowchart of a series of acts for generating a modified digital design using a diffusion neural network based on modifying chromatic information and generating an asset mask in accordance with one or more embodiments.
Figure 12:
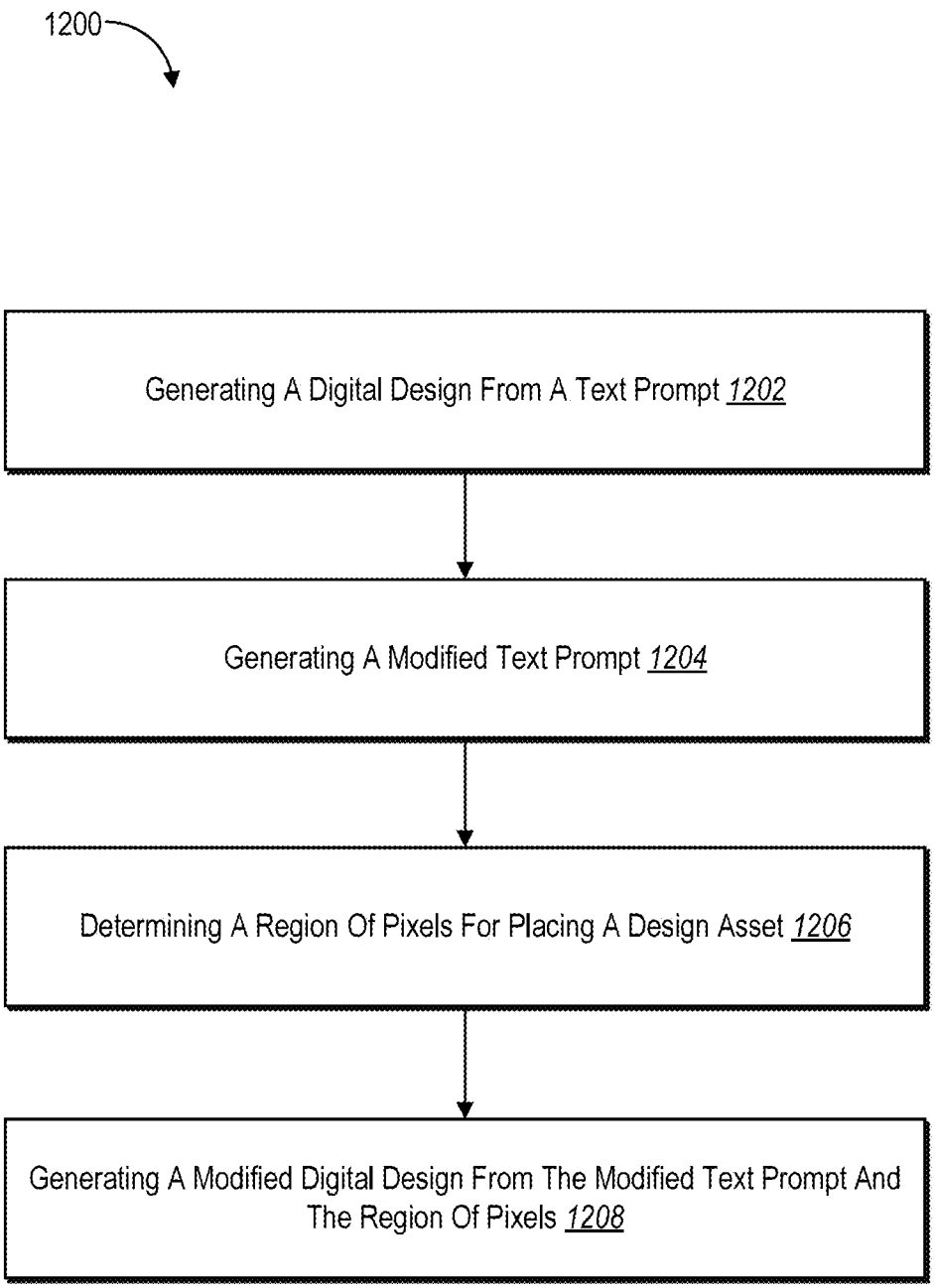
FIG. 12 illustrates an example flowchart of a series of acts for generating a modified digital design using a diffusion neural network based on modifying chromatic information and determining a region of pixels for placing a design asset in accordance with one or more embodiments.

While FIGS. 10-12 illustrate acts according to particular embodiments, alternative embodiments may omit, add to, reorder, and/or modify any of the acts shown in FIGS. 10-12. The acts of FIGS. 10-12 can be performed as part of a method. Alternatively, a non-transitory computer readable medium can comprise instructions, that when executed by one or more processors, cause a computing device to perform the acts of FIGS. 10-12. In still further embodiments, a system can perform the acts of FIGS. 10-12. Additionally, the acts described herein may be repeated or performed in parallel with one another or in parallel with different instances of the same or other similar acts.

FIG. 10 illustrates an example series of acts 1000 for generating a modified digital design using a diffusion neural network based on modifying chromatic information and determining an adaptive strength in accordance with one or more embodiments. In particular, the series of acts 1000 includes an act 1002 of accessing a text prompt for a digital design. For example, the act 1002 involves accessing a text prompt defining visual attributes of a digital design comprising a background image and a design asset overlaid on the background image. In addition, the series of acts 1000 includes an act 1004 of generating a modified text prompt. For example, the act 1004 involves generating a modified text prompt by replacing chromatic information from the text prompt indicating colors of the background image with replacement chromatic information based on a color of the design asset. Further, the series of acts 1000 includes an act 1006 of determining an adaptive strength for a diffusion neural network. For example, the act 1006 involves determining an adaptive strength for a diffusion neural network that generates digital designs from text prompts. Further still, the series of acts 1000 includes an act 1008 of generating, utilizing the diffusion neural network to process the modified text prompt according to the adaptive strength, a modified digital design comprising a modified background image and a modified design asset.

In some embodiments, the series of acts 1000 includes an act of accessing the text prompt by one or more of: generating, utilizing a captioning model, the text prompt from the digital design received from a client device or receiving the text prompt as text input from the client device. In these or other embodiments, the series of acts 1000 includes acts of determining, utilizing a region proposal model, a proposed pixel region within the background image of the digital design for moving the design asset and generating the modified digital design by moving the design asset to the proposed pixel region within the background image.

In one or more embodiments, the series of acts 1000 includes an act of generating the modified text prompt by:

determining a chromatically opposite color from the color of the design asset and replacing the chromatic information from the text prompt with the chromatically opposite color. In certain embodiments, the series of acts 1000 includes an act of generating the modified digital design comprises injecting luminance in a region of pixels within the background image overlapped by the design asset.

In some cases, the series of acts 1000 includes an act of generating the modified digital design by: generating an asset mask that masks pixels of the background image corresponding to a proposed region for the design asset and modifying, utilizing the diffusion neural network guided by the asset mask, an intermediate digital design depicting modified colors and luminance. In some embodiments, the series of acts 1000 includes an act of generating the modified digital design by: determining, utilizing a contrast correction algorithm, a dominant color from among a set of colors for pixels in a region of the background image overlapped by a glyph of the design asset, determining, utilizing the contrast correction algorithm, a contrast ratio between a color of the glyph and the dominant color, and modifying, utilizing the contrast correction algorithm, the color of the glyph according to the contrast ratio.

FIG. 11 illustrates an example series of acts 1100 for generating a modified digital design using a diffusion neural network based on modifying chromatic information and generating an asset mask in accordance with one or more embodiments. In particular, the series of acts 1100 includes an act 1112 of generating a text prompt from a digital design. For example, the act 1112 involves generating, from a digital design comprising a background image and a design asset, a text prompt comprising a text description of the digital design. In addition, the series of acts 1100 includes an act 1114 of determining a modified text prompt. For example, the act 1114 involves determining a modified text prompt by replacing chromatic information from the text prompt indicating colors of the background image with replacement chromatic information based on a color of the design asset. Further, the series of acts 1100 includes an act 1116 of generating an asset mask for a design asset. For example, the act 1116 involves generating an asset mask that masks pixels of the background image corresponding to a proposed region for the design asset. Further still, the series of acts 1100 includes an act 1118 of generating a modified digital design from the modified text prompt and the asset mask. For example, the act 1118 involves generating, utilizing a diffusion neural network to process the modified text prompt according to the asset mask, a modified digital design comprising a modified background image and a modified design asset.

In some embodiments, the series of acts 1100 includes an act of generating the text prompt from the digital design by utilizing a captioning neural network to generate a text description of the digital design. In the same or other embodiments, the series of acts 1100 includes an act of determining an adaptive strength for the diffusion neural network by determining a diffusion strength of the diffusion neural network according to a distance of a prompt vector extracted from the text prompt and a center of classifier guidance in a latent space. In some cases, the series of acts 1100 includes an act of generating the modified digital design by injecting fractal noise in a region of pixels within the background image overlapped by the design asset.

In one or more embodiments, the series of acts 1100 includes an act of generating the modified text prompt by: determining a chromatically opposite color from the color of the design asset utilizing a three-dimensional binary search in a color space and replacing the chromatic information from the text prompt with the chromatically opposite color. In some cases, the series of acts 1100 includes an act of generating the modified digital design by: determining a dominant color from among a set of colors for pixels in a region of the background image overlapped by a glyph of the design asset, determining a contrast ratio between a color of the glyph and the dominant color, and modifying the color of the glyph according to the contrast ratio. In one or more embodiments, the series of acts 1100 includes an act of generating the modified digital design by generating a plurality of modified digital designs comprising one or more of: modified locations for the design asset according to different proposed regions from a region proposal neural network or modified colors for text within the design asset according contrast ratios between text colors of the design asset and colors of pixels within regions of the background image overlapped by the design asset.

FIG. 12 illustrates an example series of acts 1200 for generating a modified digital design using a diffusion neural network based on modifying chromatic information and determining a region of pixels for placing a design asset in accordance with one or more embodiments. In particular, the series of acts 1200 includes an act 1202 of generating a digital design from a text prompt. For example, the act 1202 involves generating, utilizing a diffusion neural network to process a text prompt, a digital design comprising a background image and a design asset overlaid on the background image. In addition, the series of acts 1200 includes an act 1204 of generating a modified text prompt. For example, the act 1204 involves generating a modified text prompt by replacing chromatic information from the text prompt indicating colors of the background image with replacement chromatic information based on a color of the design asset. Further, the series of acts 1200 includes an act 1206 of determining a region of pixels for placing a design asset. For example, the act 1206 involves determining, utilizing a region proposal neural network, a region of pixels within the background image for placing the design asset. Further still, the series of acts 1200 includes an act 1208 of generating a modified digital design from the modified text prompt and the region of pixels. For example, the act 1208 involves generating, utilizing the diffusion neural network to process the modified text prompt, a modified digital design comprising a modified background image and a modified design asset placed in the region of pixels.

In one or more embodiments, the series of acts 1200 includes an act of generating the digital design from the text prompt by utilizing the diffusion neural network to denoise a noise vector toward a prompt vector extracted from the text prompt. In these or other embodiments, the series of acts 1200 includes an act of generating the modified digital design by: injecting luminance in a region of pixels within the background image overlapped by the design asset and injecting fractal noise in the region of pixels within the background image overlapped by the design asset.

In certain cases, the series of acts 1200 includes an act of generating the modified text prompt by: extracting, from the text prompt, a chromatic vector defining color values for the design asset, generating a chromatically opposite chromatic vector from the chromatic vector defining color values for the design asset, and replacing the chromatic vector with the chromatically opposite chromatic vector within a prompt embedding. In some embodiments, the series of acts 1200 includes an act of determining an adaptive strength for the diffusion neural network that indicates how much of the background image to preserve when utilizing the diffusion neural network to generate the modified digital design. In one or more embodiments, the series of acts 1200 includes an act of generating the modified digital design by generating a plurality of modified digital designs comprising modified locations for the design asset according to different proposed regions from a region proposal neural network.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
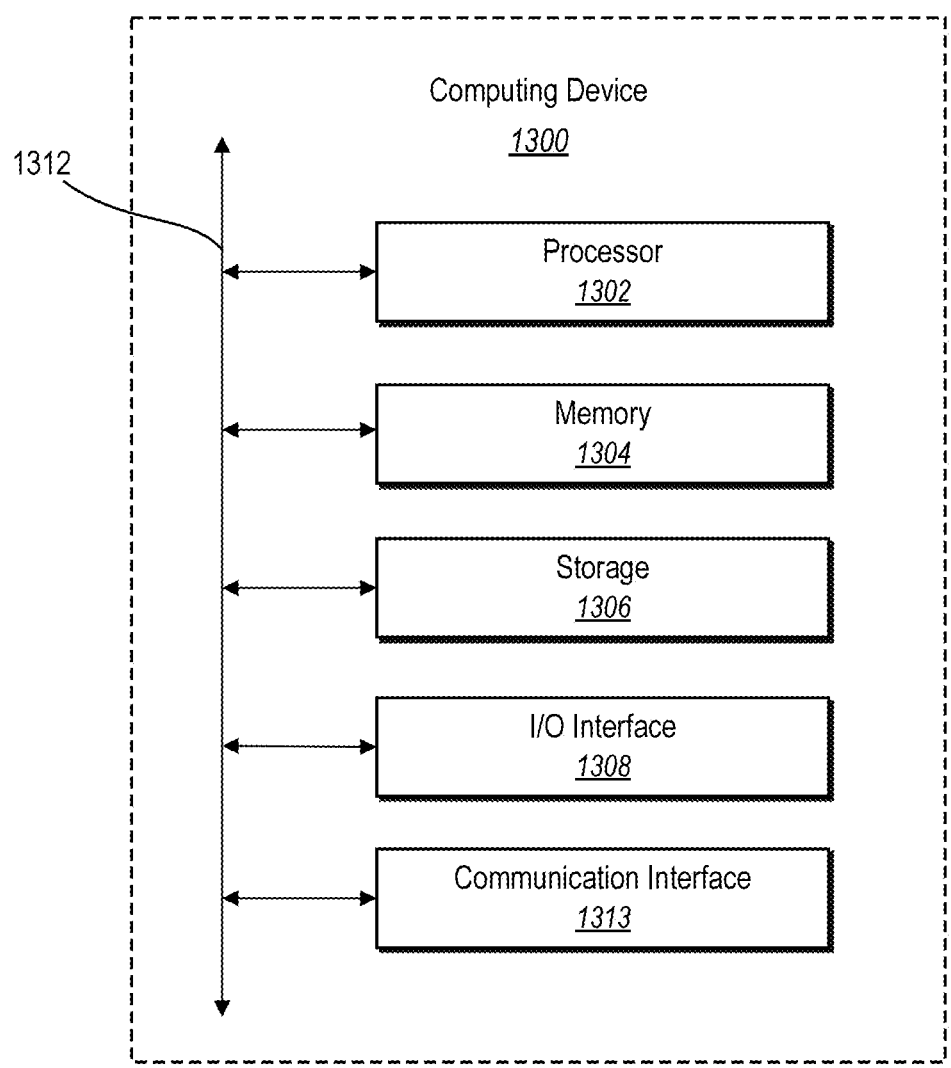
FIG. 13 illustrates a block diagram of an example computing device in accordance with one or more embodiments.

FIG. 13 illustrates, in block diagram form, an example computing device 1300 (e.g., the computing device 900, the client device 108, and/or the server(s) 104) that may be configured to perform one or more of the processes described above. One will appreciate that the design harmonization system 102 can comprise implementations of the computing device 1300. As shown by FIG. 13, the computing device can comprise a processor 1302, memory 1304, a storage device 1306, an I/O interface 1308, and a communication interface 1313. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1313. The communication interface 1313 can include hardware, software, or both. The communication interface 1313 can provide one or more interfaces for communication (such as, for example, packet-based communication) between the computing device and one or more other computing devices 1300 or one or more networks. As an example, and not by way of limitation, communication interface 1313 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    accessing a text prompt defining visual attributes of a digital design;
    generating a modified text prompt by replacing chromatic information within the text prompt;
    determining an adaptive strength for a diffusion neural network by determining a diffusion strength of the diffusion neural network based on the text prompt; and
    generating a modified digital design utilizing the diffusion neural network to process the modified text prompt according to the adaptive strength.

2. The method of claim 1, wherein accessing the text prompt comprises one or more of:
    generating, utilizing a captioning neural network, the text prompt from the digital design received from a client device; or
    receiving the text prompt as text input from the client device.

3. The method of claim 1, further comprising:
    determining, utilizing a region proposal neural network, a proposed pixel region within a background image of the digital design for placing a design asset; and
    generating the modified digital design by placing the design asset in the proposed pixel region within the background image.

4. The method of claim 1, wherein generating the modified text prompt comprises:
    determining a chromatically opposite color from a color of a design asset within the digital design; and
    replacing the chromatic information from the text prompt with the chromatically opposite color.

5. The method of claim 1, wherein generating the modified digital design comprises injecting luminance in a region of pixels within a background image of the digital design overlapped by a design asset.

6. The method of claim 1, wherein generating the modified digital design comprises:
generating an asset mask that masks pixels of a background image within the digital design corresponding to a proposed region for a design asset; and
modifying, utilizing the diffusion neural network guided by the asset mask, an intermediate digital design depicting modified colors and luminance.

7. The method of claim 1, wherein generating the modified digital design comprises:
determining, utilizing a contrast correction algorithm, a color palette comprising a set of colors for pixels in a region of a background image within the digital design overlapped by a glyph of a design asset;
determining, utilizing the contrast correction algorithm, contrast ratios between a color of the glyph and the set of colors within the color palette; and
modifying, utilizing the contrast correction algorithm, the color of the glyph according to the contrast ratios.

8. A system comprising:
a memory component; and
one or more processing devices coupled to the memory component, the one or more processing devices to perform operations comprising:
generating a text prompt from a digital design comprising a background image and a design asset;
determining a modified text prompt by replacing chromatic information within the text prompt;
generating an asset mask for a region of the background image corresponding to the design asset; and
generating a modified digital design utilizing a diffusion neural network to process the modified text prompt according to the asset mask.

9. The system of claim 8, wherein generating the text prompt from the digital design comprises utilizing a captioning neural network to generate a text description of the digital design.

10. The system of claim 8, wherein the operations further comprise determining an adaptive strength for the diffusion neural network by determining a diffusion strength of the diffusion neural network according to a distance of a prompt vector extracted from the text prompt and a center of classifier guidance in a latent space.

11. The system of claim 10, wherein the one or more processing devices further perform operations comprising:
generating, using the diffusion neural network, a projection norm of a sample text prompt in an embedding space;
selecting an adaptive strength value from among a set of candidate adaptive strength values for generating digital designs; and
training a support vector regression function to determine the adaptive strength for the diffusion neural network based on the projection norm and the adaptive strength value.

12. The system of claim 8, wherein generating the modified text prompt comprises:
determining a chromatically opposite color from a color of the design asset utilizing a three-dimensional binary search in a color space; and
replacing the chromatic information from the text prompt with the chromatically opposite color.

13. The system of claim 8, wherein generating the modified digital design comprises:
determining a dominant color from among a set of colors for pixels in a region of the background image overlapped by a glyph of the design asset;
determining a contrast ratio between a color of the glyph and the dominant color; and
modifying the color of the glyph according to the contrast ratio.

14. The system of claim 8, wherein generating the modified digital design comprises generating a plurality of modified digital designs comprising one or more of:
modified locations for the design asset according to different proposed regions from a region proposal neural network; or
modified colors for text within the design asset according contrast ratios between text colors of the design asset and colors of pixels within regions of the background image overlapped by the design asset.

15. A non-transitory computer readable medium storing instructions which, when executed by a processing device, cause the processing device to perform operations comprising:
generating, utilizing a diffusion neural network to process a text prompt, a digital design comprising a background image and a design asset;
generating a modified text prompt by replacing chromatic information within the text prompt;
determining, utilizing a region proposal neural network, a region of pixels within the background image for placing the design asset; and
generating, utilizing the diffusion neural network to process the modified text prompt, a modified digital design comprising a modified design asset placed in the region of pixels.

16. The non-transitory computer readable medium of claim 15, wherein generating the digital design from the text prompt comprises utilizing the diffusion neural network to denoise a noise vector toward a prompt vector extracted from the text prompt.

17. The non-transitory computer readable medium of claim 15, wherein generating the modified digital design comprises:
injecting luminance in a region of pixels within the background image overlapped by the design asset; and
injecting fractal noise in the region of pixels within the background image overlapped by the design asset.

18. The non-transitory computer readable medium of claim 15, wherein generating the modified text prompt comprises:
extracting, from the text prompt, a chromatic vector defining color values for the design asset;
generating a chromatically opposite chromatic vector from the chromatic vector defining color values for the design asset; and
replacing the chromatic vector with the chromatically opposite chromatic vector within a prompt embedding.

19. The non-transitory computer readable medium of claim 15, wherein the operations further comprise determining an adaptive strength for the diffusion neural network that indicates how much of the background image to preserve when utilizing the diffusion neural network to generate the modified digital design.

20. The non-transitory computer readable medium of claim 15, wherein generating the modified digital design comprises generating a plurality of modified digital designs comprising modified locations for the design asset according to different proposed regions from a region proposal neural network.

* * * * *